(12) United States Patent
Hamada

(10) Patent No.: US 6,921,066 B2
(45) Date of Patent: Jul. 26, 2005

(54) CONNECTOR ASSEMBLY AND CONNECTING DEVICE FOR STEERING WHEEL

(75) Inventor: Masaaki Hamada, Konan (JP)

(73) Assignee: Tokai Rubber Industries, Ltd., Komaki (JP)

( * ) Notice: Subject to any disclaimer, the term of this patent is extended or adjusted under 35 U.S.C. 154(b) by 24 days.

(21) Appl. No.: 10/663,527

(22) Filed: Sep. 15, 2003

(65) Prior Publication Data

US 2004/0060789 A1 Apr. 1, 2004

(30) Foreign Application Priority Data

Sep. 27, 2002 (JP) .......................................... 2002-283202
Jun. 30, 2003 (JP) .......................................... 2003-186543

(51) Int. Cl.⁷ ................................................ B62D 1/10
(52) U.S. Cl. ..................... 267/140.12; 267/293; 74/492; 74/552
(58) Field of Search ................................... 188/378, 379; 267/140.12, 292, 293; 74/492, 552; 280/728.2, 731

(56) References Cited

U.S. PATENT DOCUMENTS

| 3,843,152 | A | * | 10/1974 | Nonaka ....................... 280/731 |
| 3,938,404 | A | * | 2/1976 | Murase et al. ................. 74/492 |
| 4,116,087 | A | * | 9/1978 | Zeller ........................... 74/552 |
| 4,517,854 | A | * | 5/1985 | Kawabata et al. ............. 74/492 |
| 5,190,269 | A | * | 3/1993 | Ikeda et al. ............. 267/140.12 |
| 5,704,597 | A | * | 1/1998 | Hofmann et al. ........ 267/140.12 |
| 5,975,509 | A | * | 11/1999 | Miyamoto .............. 267/140.12 |
| 6,199,840 | B1 | * | 3/2001 | Yano ...................... 267/140.12 |
| 6,508,343 | B2 | | 1/2003 | Misaji et al. |
| 6,619,639 | B1 | * | 9/2003 | Shelley et al. ............... 267/292 |

FOREIGN PATENT DOCUMENTS

| JP | 5-238394 A | 9/1993 |
| JP | 9-71208 A | 3/1997 |
| JP | 10-181611 A | 7/1998 |
| JP | P2001-239943 A | 9/2001 |

\* cited by examiner

*Primary Examiner*—Chris Schwartz
(74) *Attorney, Agent, or Firm*—Burr & Brown

(57) ABSTRACT

A connector assembly/device for elastically connecting a steering wheel to a rotary member supported by a stationary member so the rotary member is rotatable upon rotation of the steering wheel, including a first member fixed to the rotary member for rotation therewith, a second member fixed to the steering wheel for rotation steering wheel, an elastic body interposed between the first and second members to elastically connect the first and second members, and a relative-rotation restrictor located between the first and second members, for restricting an amount of elastic deformation of the elastic body upon rotation of the second member relative to the first member, to restrict a maximum angle of relative rotation of the first and second members permitted by the elastic deformation of the elastic body, for thereby restricting a maximum angle of rotation of the steering wheel relative to the rotary member.

13 Claims, 13 Drawing Sheets

CONNECTOR ASSEMBLY AND CONNECTING DEVICE FOR STEERING WHEEL

This application is based on Japanese Patent Application Nos. 2002-283202 and 2003-186543 respectively filed on Sep. 27, 2002 and Jun. 30, 2003, the contents of which are incorporated hereinto by reference.

BACKGROUND OF THE INVENTION

1. Field of the Invention

The present invention relates in general to a connector assembly and a connecting device for a steering wheel, and more particularly to such steering-wheel connector assembly and connecting device arranged to connect, in a vibration-damping manner, a steering wheel of a vehicle to a rotary member such as a steering shaft which is supported by a stationary member such that the rotary member is rotatable to steer the vehicle.

2. Discussion of Related Art

A vehicle such as an automobile is provided with a steering system including a steering wheel and a steering shaft connected to the steering wheel. When the steering wheel is rotated to steer the vehicle, the steering shaft is rotated with the steering wheel, and a rotary motion of the steering shaft is transmitted through a gear mechanism to a link mechanism connected to axles of steerable wheels, so that the steering angle of the steerable wheels is changed according to an angle of rotation of the steering wheel and shaft.

In a steering system as described above, there is interposed an elastic joint which elastically or flexibly connect a shaft of the steering gear and the steering shaft, to reduce the amount of transmission of vibrations from the axles to the steering wheel during running of the vehicle, for thereby reducing the magnitude of the vibration applied to the steering wheel which is directly manipulated by the operator or driver of the vehicle. However, the provision of the elastic joint is not sufficient to completely protect the steering wheel from the vibration applied thereto.

In a vehicle steering system generally known in the art, the steering shaft is supported by a column tube or other stationary member fixed to the body of the vehicle, such that the steering shaft is rotatable about its axis. In this arrangement, a vibration generated during an idling operation of an engine of the vehicle while the vehicle is stopped is transmitted from the vehicle body to the steering wheel through the above-indicated stationary and the steering shaft. The mere provision of the elastic joint elastically connecting the shaft of the steering gear and the steering shaft is not enough to effectively reduce the amount of the vibration transmitted from the vehicle body to the steering wheel.

There is also known a steering system of by-wire type similar to an accelerator system or braking system of by-wire type. In the by-wire type steering system, the steering shaft is not provided, and the steering wheel is connected to a rotary member which is supported by a stationary member fixed to the vehicle body such that the steering wheel is rotatable about its axis with the rotary member. An actuator to change the angle of the steerable wheels is controlled by an electronic control device according to a rotary motion of the steering wheel. In this steering system of by-wire type, the above-indicated elastic joint elastically connected to the shaft of the steering gear and the steering shaft cannot be used for damping the vibration of the steering wheel.

In view of the above-indicated problem of the known steering system, various types of connector structure for connecting the steering wheel to the steering shaft have recently been proposed in an attempt to minimize the amount of vibration transmitted from the vehicle body to the steering wheel.

One of the various types of connector structure includes a dynamic damper provided at a central boss portion of the steering wheel, as disclosed in JP-A-5-238394 and JP-A-2001-239943. The dynamic damper includes a spring portion in the form of an elastic body and a mass portion, and the steering wheel is connected to the steering shaft, at the central boss portion provided with the dynamic damper. In this type of connector structure, the vibration of the steering wheel is effectively damped owing to resonance of the dynamic damper. However, the steering wheel provided with the dynamic damper tends to be considerably complicated in construction.

JP-A-9-71208 discloses another type of connector structure, which includes an elastic member interposed between the steering wheel and a plate fixed to the steering shaft. The steering wheel and the plate are fixed together with suitable fastening means such as bolts, with the elastic member interposed therebetween. In this simple arrangement of steering-wheel connector structure, the amount of the vibration transmitted from the steering shaft to the steering wheel is reduced owing to elastic deformation of the elastic member interposed at the connection between the steering shaft and the steering wheel.

In the known steering-wheel connector structure described just above, the amount of elastic deformation of the elastic member is limited since the steering wheel is fixed or connected to the steering column by suitable fastening means such as screws. Accordingly, the elastic member does not provide a sufficient or satisfactory damping effect based on the elastic deformation, with respect to the vibration of the steering wheel.

To permit a sufficient amount of elastic deformation of an elastic body interposed between the steering wheel and the steering shaft, it is considered to eliminate the screws or any other fastening means used to fix the steering wheel to the steering shaft, so that the steering wheel and the steering shaft are connected to each other by only the elastic body. In this case where the steering wheel and the steering shaft connected together by only the elastic body, the elastic body is permitted to exhibit a considerably low degree of torsional spring stiffness, undesirably resulting in an accordingly low rate of transmission of a rotary motion of the steering wheel to the steerable wheels, namely, an accordingly low degree of response of the steering wheels to the rotary motion of the steering wheel, as felt by the vehicle operator, and a low degree of maneuverability of the steering wheel.

SUMMARY OF THE INVENTION

The present invention was made in view of the background art discussed above. It is a first object of the present invention to provide a steering-wheel connector assembly which permits sufficient reduction in the amount of vibration to be transmitted from the vehicle body to the steering wheel, to thereby effectively reduce or prevent the vibration of the steering wheel, without complicating the construction of the steering wheel or deteriorating the maneuverability of the steering wheel. A second object of this invention is to provide a steering-wheel connecting device including a steering-wheel connector structure which may or may not be the steering-wheel connector assembly and which performs the same function as the steering-wheel connector assembly indicated above.

The first object indicated above may be achieved according to a first aspect of the present invention, which provides a steering-wheel connector assembly for elastically connecting a steering wheel of a vehicle to a rotary member which is supported by a stationary member fixed to a body of the vehicle such that the rotary member is rotatable about an axis thereof, upon rotation of the steering wheel to steer the vehicle, the connector assembly comprising:

a first member to be fixed to the rotary member such that the first member and the rotary member are rotatable as a unit;

a second member to be fixed to the steering wheel such that the second member and the steering wheel are rotatable as a unit;

an elastic body interposed between the first and second members such that the steering wheel is elastically connected to the rotary member by only the elastic body through the first and second members; and relative-rotation restricting means located between the first and second members, for restricting an amount of elastic deformation of the elastic body upon a rotary motion of the second member relative to the first member, to restrict a maximum angle of rotation of the second member relative to the first member, which rotation is permitted by the elastic deformation of the elastic body, whereby a maximum angle of rotation of the steering wheel relative to the rotary member is restricted by the relative-rotation restricting means.

The steering-wheel connector assembly according to the first aspect of the present invention is arranged such that the steering wheel, and the rotary member rotatably supported by the stationary member fixed to the vehicle body are elastically connected to each other by the elastic body, through the first and second members to which the rotary member and the steering wheel are respectively fixed such that the first member is rotatable with the rotary member while the second member is rotatable with the steering wheel. When the rotary member is vibrated with the stationary member due to a vibration of the vehicle body, the vibration of the rotary member is absorbed by elastic deformation of the elastic body, so that the transmission of the vibration from the rotary member to the steering wheel is effectively reduced or prevented. Thus, the present steering-wheel connector assembly permits effective reduction or prevention of the vibration transmitted from the vehicle body to the steering wheel.

Further, the present steering-wheel connector assembly which is capable of effectively functioning to reduce the magnitude of the vibration transmitted from the vehicle body to the steering wheel is extremely simple in construction, employing only the elastic body elastically connecting the steering wheel and the rotary member to each other through the first and second members, without using any complex vibration damping device such as a conventionally used dynamic damper. In addition, the steering wheel and the rotary member are elastically connected by only the elastic body through the first and second members, and are not connected or fixed to each other by any rigid fastening means other than the elastic body, so that the steering wheel is not bound by the rotary member through such rigid fastening means, and the elastic body provided to elastically connect the steering wheel and the rotary member exhibits a desired vibration damping characteristic with a suitable amount of elastic deformation.

However, the elastic body which elastically connects the steering wheel and the rotary member exhibits a sufficiently high torsional spring stiffness after the angle of rotation of the steering wheel relative to the rotary member has increased to a predetermined maximum value or upper limit, which is defined by the relative-rotation restricting means which is located between the first member to be fixed to the rotary member and the second member to be fixed to the steering wheel. The relative-rotation restricting means is arranged to restrict the amount of elastic deformation of the elastic body upon a rotary motion of the second member relative to the first member, so as to restrict the maximum angle of rotation of the second member relative to the first member, which rotation is permitted by the elastic deformation of the elastic body.

In addition, the steering-wheel connector assembly according to the first aspect of the present invention assures elastic connection of the steering wheel to the rotary member so as to effectively reduce the magnitude of the vibration to be transmitted from the vehicle body to the steering wheel through the rotary member, without requiring the steering wheel to have a complicated construction, and without deteriorating the maneuverability of the steering wheel or a delay in the transmission of a rotary motion of the steering wheel to the rotary member. The present connecting device makes it possible to effectively minimize or prevent the vibration of the steering wheel connected to the rotary member, without suffering from such problems.

The present steering-wheel connector assembly capable of effectively damping the vibration to be transmitted from the vehicle body to the steering wheel may be used in a steering system of a type in which the steering wheel is not connected to a steering shaft but is merely rotatably supported by the vehicle body through the rotary member rotatably supported by the stationary member fixed to the vehicle body, and in which an actuator to change the angle of steerable wheels of the vehicle is controlled by an electronic controller according to a rotary motion of the steering wheel. In this case, too, the present connector assembly 10 is effective to minimize the magnitude of the vibration transmitted from the vehicle body to the steering wheel.

The present steering-wheel connector assembly is further advantageous in that the elastic body exhibits a relatively low spring stiffness with respect to a torsional or rotary movement between the steering wheel and the rotary member, until the rotation of the steering wheel relative to the rotary member is restricted by the relative-rotation restricting means. That is, an optimum amount of play of the steering wheel the maximum angle of the rotation of the steering wheel in its rotating direction can be easily adjusted by suitably determining the maximum angle of rotation of the steering wheel relative to the rotary member, which maximum angle of rotation is permitted or established by the relative-rotation restricting means.

In a first preferred form of the steering-wheel connector assembly according to the first aspect of this invention, the rotary member is a steering shaft operatively connected to a steerable wheel of the vehicle. In this case, the steering wheel is elastically connected to the steering shaft by the present steering-wheel connector assembly, so as to effectively reduce the magnitude of the vibration transmitted from the vehicle body to the steering wheel through the steering shaft.

In a second preferred form of the steering-wheel connector assembly of the invention, the elastic body has at least one void formed therethrough so as to extend in an axial direction of the steering wheel. In this case, the spring stiffness of the elastic body in the radial direction is lowered at each of the at least one void formed in the axial direction, so that the vibration which is transmitted from the vehicle body to the steering wheel through the rotary member and which acts in the radial direction of the steering wheel can be effectively damped.

In one advantageous arrangement of the steering-wheel connector assembly according to the second preferred form of the invention described above, the above-indicated at least one void consists of a plurality of voids including two voids which are opposed to each other in a diametric direction of the steering wheel.

Preferably, the plurality of voids indicated above consist of four voids which are equally spaced from each other by an angular interval of 90° in a rotating or circumferential direction of the steering wheel.

Where the steering-wheel connector assembly having the four voids having the angular spacing interval of 90° in the rotating direction of the steering wheel as described above is connected between the steering wheel and the rotary member such that the two voids are opposed to each other in the vertical direction while the two other voids are opposed to each other in the horizontal direction, the elastic body exhibits a sufficiently reduced spring stiffness with respect to not only a vibrational load applied to the connector assembly in the vertical direction, but also a vibrational load applied to the connector assembly in the horizontal direction, since the four voids formed in the elastic body are located at the respective upper, lower, right and left positions. Accordingly, the magnitude of the vibration transmitted from the rotary member to the steering wheel can be more effectively reduced.

In another advantageous arrangement of the steering-wheel connector assembly according to the second preferred form of the invention described above, at least one of the above-indicated at least one void is partially defined by at least one pair of opposed inner surfaces which are opposed to each other in a rotating direction of the steering wheel, and which are brought into abutting contact with each other upon a rotary motion of the steering wheel relative to the rotary member. In this case, the amount of play of the steering wheel in its rotating direction can be easily adjusted by suitably determining the distance between the opposed inner surfaces of the elastic body which partially define each of the selected at least one void, without adjusting the maximum angle of rotation of the steering wheel relative to the rotary member.

In a third preferred form of the steering-wheel connector assembly according to the first aspect of the present invention, the first member consists of an inner cylindrical member to be coaxially fixed to the rotary member, and the second member consists of an outer cylindrical member which is disposed radially outwardly of the inner cylindrical member with a predetermined radial spacing therebetween and which is to be coaxially fixed to the steering wheel. In this case, the elastic body is interposed between the inner and outer cylindrical members, and the relative-rotation restricting means includes a plurality of projections each of which extends from one of an outer circumferential surface of the inner cylindrical member and an inner circumferential surface of the outer cylindrical member toward the other of the outer and inner circumferential surfaces, so as to substantially isolate the elastic body into a plurality of portions.

In the steering-wheel connector assembly according to the third preferred form of the first aspect of the invention, the outer member in the form of the outer cylindrical member fixed to the steering wheel such that the outer cylindrical member and the steering wheel are rotatable as a unit is disposed radially outwardly of the first member in the form of the inner cylindrical member fixed to the rotary member such that the inner cylindrical member and the rotary member are rotatable as a unit. These outer and inner cylindrical members are elastically connected by the elastic body such that the elastic body is disposed within the axial length of the outer cylindrical member, and such that the outer cylindrical member is positioned within the axial length of the inner cylindrical member. This arrangement is effective to reduce the required axial dimension of the connector assembly, and accordingly reduce the axial size of the steering system including the rotary member and the steering wheel which are elastically connected to each other by the connector assembly. In this respect, it is noted that the required axial dimension of the connector assembly would be larger if the inner and outer cylindrical members are spaced apart from each other in their axial direction and connected to each other by the elastic body which is axially interposed between the inner and outer cylindrical members.

The steering-wheel connector assembly according to the above-indicated third preferred form of the invention is further advantageous in that the amount of elastic deformation of the elastic body in the rotation direction of the steering wheel is suitably restricted by the plurality of projections, each of which extends from one of the outer circumferential surface of the inner cylindrical member and the inner circumferential surface of the outer cylindrical member toward the other of those outer and inner cylindrical surfaces, so as to substantially isolate the elastic body into a plurality of portions. In this arrangement, the projections function to reduce the amount of elastic deformation of the elastic body as a whole, so that the maximum angle of rotation of the outer cylindrical member relative to the inner cylindrical member, which is permitted by the elastic deformation of the elastic body, and the maximum angle of rotation of the steering wheel relative to the rotary member, can be made smaller than in an arrangement not provided with those projections which isolate the elastic body into a plurality of portions.

In a fourth preferred form of the steering-wheel connector assembly of the invention, the first member consists of a hollow inner member open at one of opposite ends thereof and having a bottom wall which closes the other of the opposite ends and at which the hollow inner member is to be fixed to the rotary member, and the second member consists of a cylindrical outer member which is disposed outwardly of the hollow inner member with a predetermined spacing therebetween in a radial direction of the cylindrical outer member and which is to be coaxially fixed to the steering wheel. In this case, the elastic body is interposed between the inner and outer cylindrical members, and the hollow inner member has side walls which cooperate with the bottom wall to define a hollow of the hollow inner member and which provide a plurality of projections extending toward an inner circumferential surface of the cylindrical outer member, so as to substantially isolate the elastic body into a plurality of portions. In this form of the connector assembly, the relative-rotation restricting means includes the plurality of projections.

In the steering-wheel connector assembly according to the fourth preferred form of the first aspect of the invention, the outer member in the form of the cylindrical outer member is disposed radially outwardly of the first member in the form of the hollow inner member, and these hollow inner member and the cylindrical outer member are elastically connected by the elastic body, so as to minimize the required axial dimension of the connector assembly and the axial size of the steering system wherein the steering wheel and the rotary member are connected to each other through the first and second members. Further, the plurality of projections provided by the side walls of the hollow inner member so as to isolate the elastic body into a plurality of portions are effective to reduce the amount of elastic deformation of the elastic body as a whole in the rotation direction of the steering wheel, for thereby effectively restricting the maximum angle of rotation of the cylindrical outer member relative to the hollow inner member, which is permitted by the elastic deformation of the elastic body, and the maximum angle of rotation of the steering wheel relative to the rotary member.

The connector assembly according to the fourth preferred form of the invention is further advantageous in that the relative-rotation restricting means is constituted by the plurality of projections of the side walls of the hollow inner member provided as the first member, so that the weight of the hollow inner member providing the relative-rotation restricting means, and the weight of the steering system provided with the relative-rotation restricting means can be significantly reduced, as compared with those of a connector assembly using a solid stopper having projections as the relative-rotation restricting means.

In a fifth preferred form of the steering-wheel connector assembly of the invention, the first member consist of a first planar member to be fixed to an end portion of the rotary member, and the second member consists of a second planar member which is spaced apart from the first planar member in an axial direction of the rotary member and which is to be fixed to the steering wheel. In this case, the elastic body consists of a plurality of elastic members which are interposed between the first and second planar members and which are spaced apart from each other in the axial direction of the rotary member, and the relative-rotation restricting means includes at least one axial projection each of which extends from one of the first and second planar members toward the other of the first and second planar members, between adjacent ones of the plurality of elastic members, such that each axial projection is spaced apart from the adjacent ones of the plurality of members.

In the steering-wheel connector assembly according to the fifth preferred form of the invention, the maximum angle of rotation of the steering wheel relative to the rotary member, which is permitted by the relative-rotation restricting means, that is, the amount of play of the steering wheel in its rotating direction can be easily adjusted by suitably adjusting the distance between each of the plurality of elastic bodies connecting the first and second members in the form of the first and second planar members, and the above-indicated at least one projection which extends between the adjacent elastic members and which is spaced apart from the adjacent elastic bodies.

The second object indicated above may be achieved according to a second aspect of this invention, which provides a steering-wheel connecting device for elastically connecting a steering wheel of a vehicle to a rotary member which is supported by a stationary member fixed to a body of the vehicle such that the rotary member is rotatable about an axis thereof, upon rotation of the steering wheel to steer the vehicle, the connecting device comprising:

a first member to be fixed to the rotary member such that the first member and the rotary member are rotatable as a unit;

a second member to be fixed to the steering wheel such that the second member and the rotary member are rotatable as a unit;

an elastic body interposed between the first and second members such that the steering wheel is elastically connected to the rotary member by only the elastic body through the first and second members; and relative-rotation restricting means located between the first and second members, for restricting an amount of elastic deformation of the elastic body upon a rotary motion of the second member relative to the first member, to restrict a maximum angle of rotation of the second member relative to the first member, which rotation is permitted by the elastic deformation of the elastic body, whereby a maximum angle of rotation of the steering wheel relative to the rotary member is restricted by the relative-rotation restricting means.

In the steering-wheel connecting device according to the second aspect of the present invention, the first member to be fixed to the rotary member such that the first member and the rotary member are rotatable as a unit, and the second member to be fixed to the steering wheel such that the second member and the steering wheel are rotatable as a unit, are elastically connected to each other by only the elastic body interposed between the first and second members, to elastically connect the steering wheel and the rotary member to each other. When the present steering-wheel connecting device is connected between the steering wheel and the rotary member, as described above, the relative-rotation restricting means functions to restrict the maximum angle of rotation of the steering wheel relative to the rotary member, by restricting the maximum angle of rotation of the second member relative to the first member, which rotation is permitted by the elastic deformation of the elastic body. The present steering-wheel connecting device may incorporate the steering-wheel connector assembly according to the first aspect of the invention, which has the advantages described above.

Accordingly, the present steering-wheel connecting device arranged to connect the steering wheel to the rotary element as described above permits effective reduction of the amount of the vibration to be transmitted from the vehicle body to the steering wheel through the rotary member, without requiring the steering wheel to have a complicated construction, and without deteriorating the maneuverability of the steering wheel and a delay in the transmission of a rotary motion of the steering wheel to the rotary member.

In one preferred form of the steering-wheel connecting device according to the second aspect of this invention described above, the relative-rotation restricting means is provided in a connector assembly which includes the first and second members and the elastic body and which is to be used in a steering system of the vehicle that includes the steering wheel and the rotary member.

In one advantageous arrangement of the preferred form of the steering-wheel connecting device described above, the relative-rotation restricting means is provided on the first member of the connector assembly.

In another preferred form of the steering-wheel connecting device of the invention, the relative-rotation restricting means includes at least one axial projection each of which extends from the steering wheel in an axial direction of the steering wheel such that each of the above-indicated at least one axial projection is located between the first and second members. In operation of the steering-wheel connecting device, the above-indicated at least one axial projection is brought into abutting contact with the elastic body in a radial direction of the rotary member upon a rotary motion of the second member relative to the first member, whereby an amount of elastic deformation of the elastic body is restricted by the at least one axial projection.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

To further clarify the present invention, several embodiments of a steering-wheel connector structure and a steering-wheel connecting device of the present invention will be described in detail, by reference to the drawings.

Figure 1:
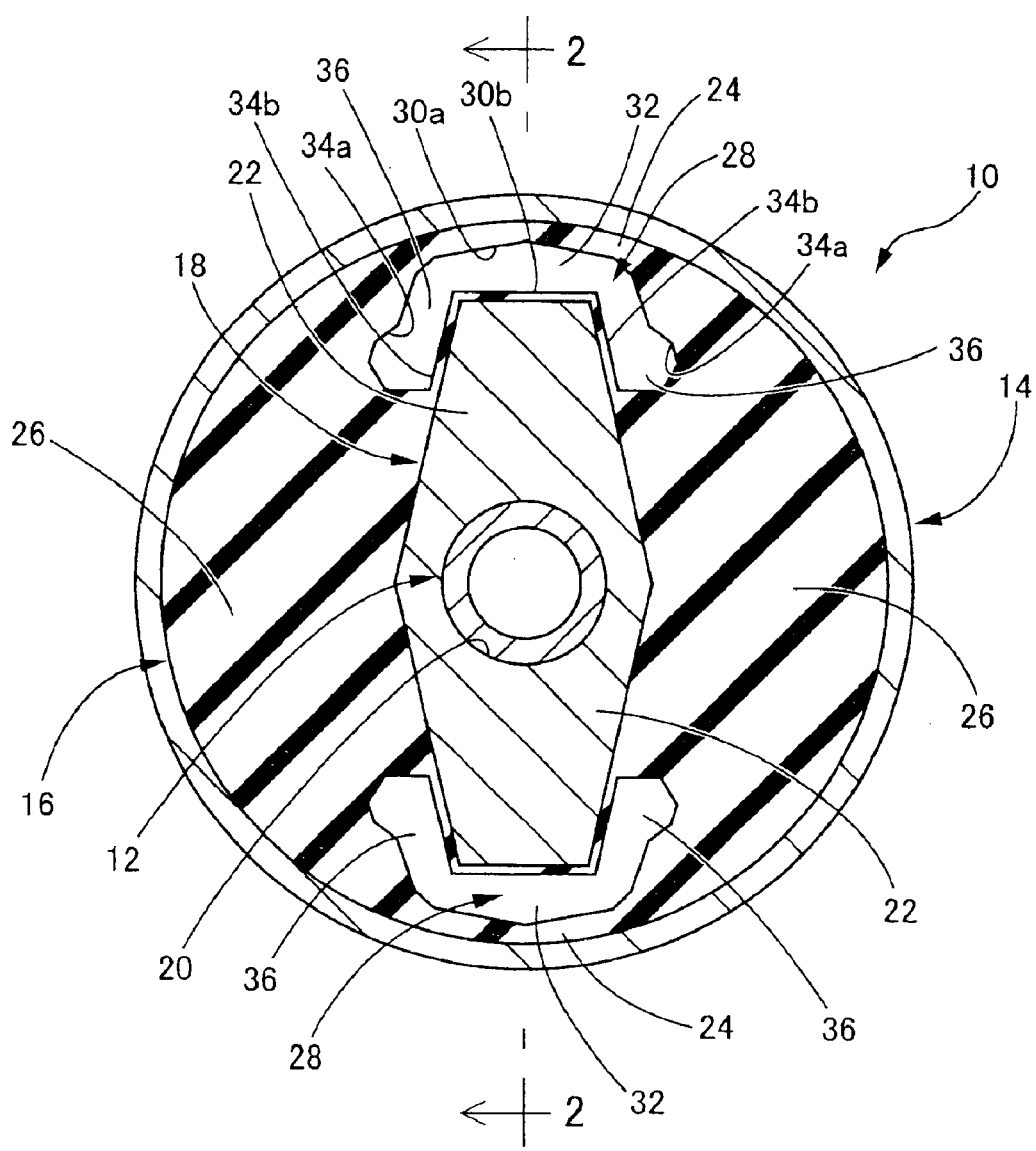
FIG. 1 is a view in transverse cross section of a steering-wheel connecting device constructed according to a first embodiment of the present invention, the view being taken along line 1—1 of FIG. 2.
Figure 2:
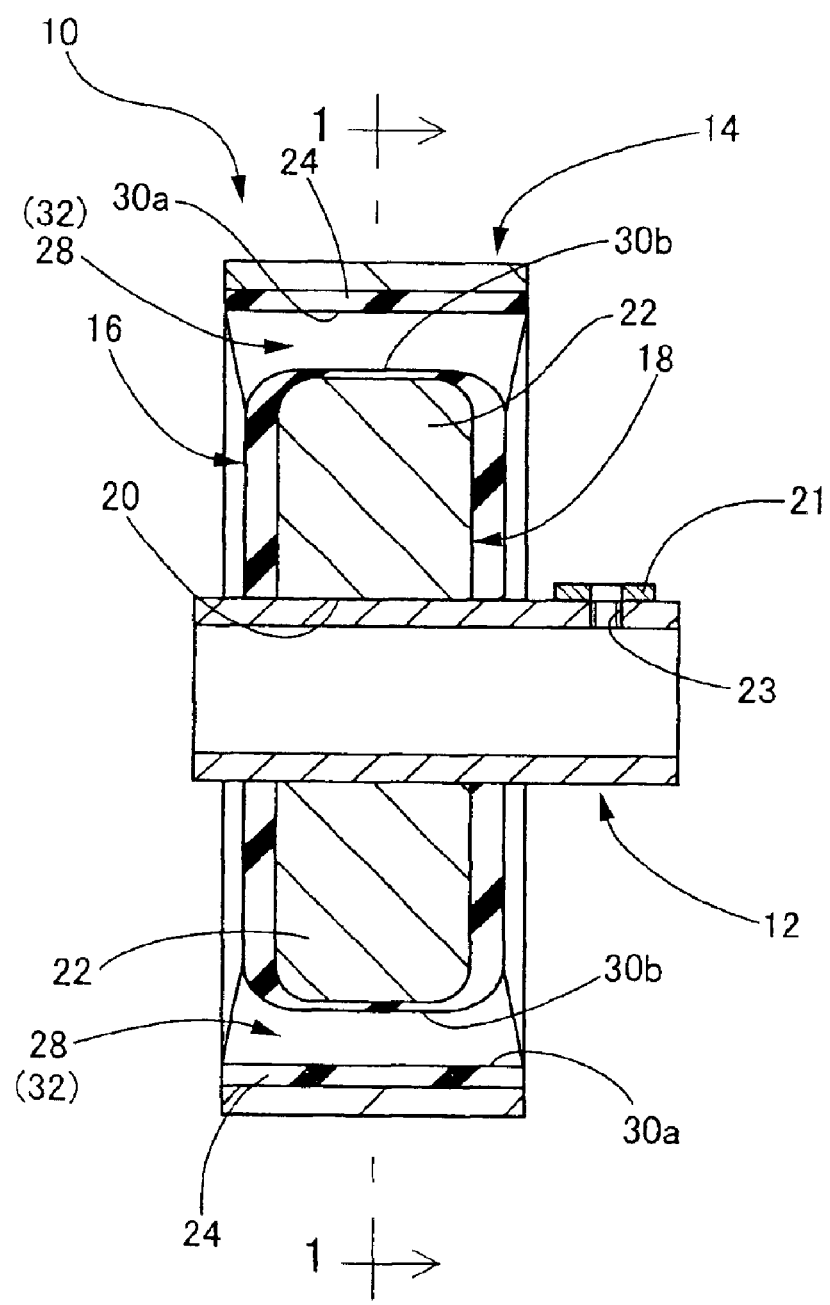
FIG. 2 is a cross sectional view of the steering-wheel connecting device taken along line 2—2 of FIG. 1.
Figure 3:
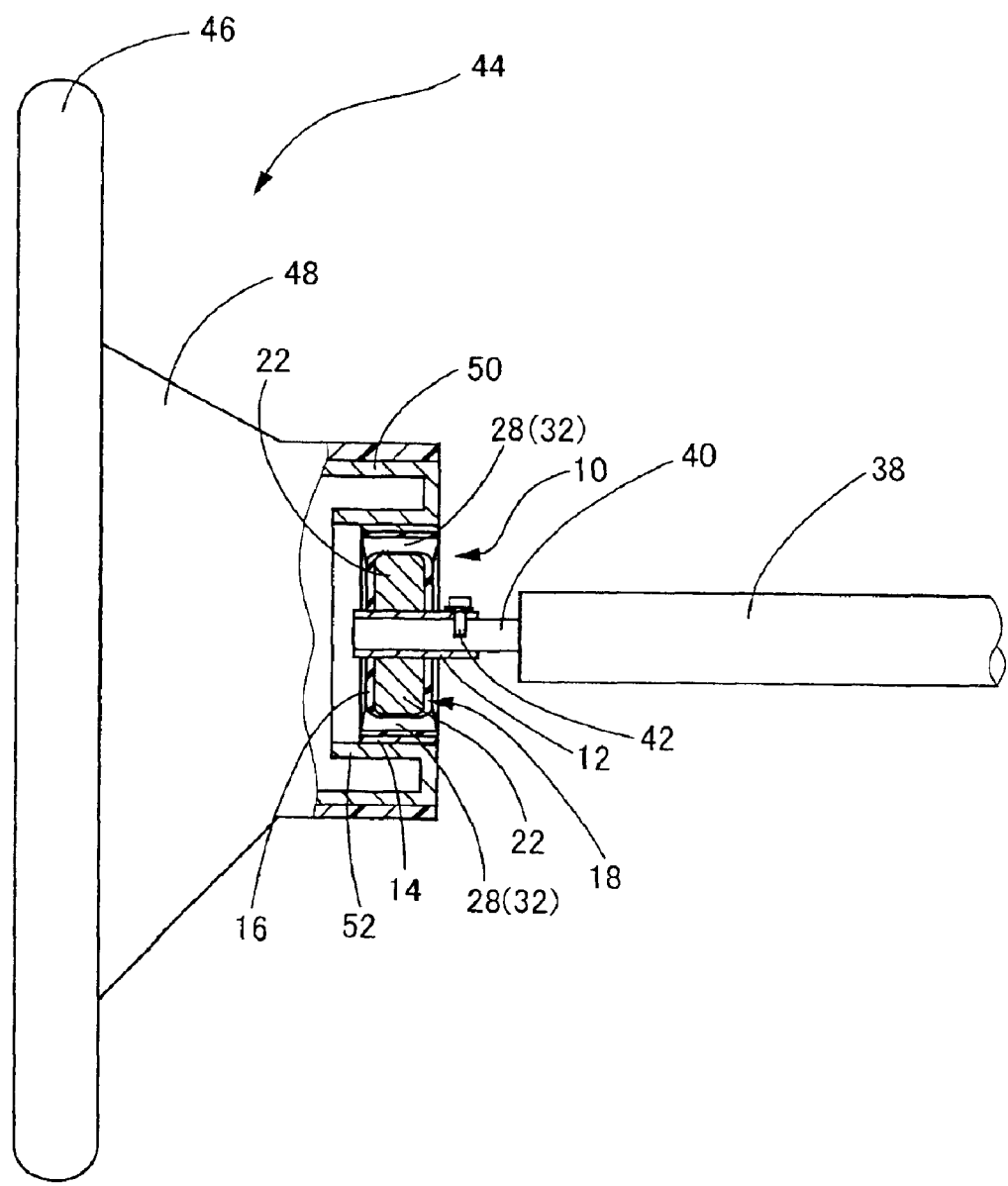
FIG. 3 is a view partly in axial cross section of the steering-wheel connecting device of FIG. 1 connecting a steering wheel to a steering shaft.

Referring first to the transverse cross sectional view of FIG. 1 and the axial cross sectional view of FIG. 2, there is shown a steering-wheel connecting device 10 constructed according to a first embodiment of this invention, for connecting a steering wheel 44 to a rotary member in the form of a steering shaft 40, in a vibration-damping manner, as shown in FIG. 3, in a steering system of a vehicle in the form of an automobile, wherein the steering shaft 40 is operatively connected to steerable wheels of the vehicle. As shown in FIGS. 1 and 2, the steering-wheel connecting device 10 includes a first member or an inner member in the form of an inner sleeve 12, and a second member or an outer member in the form of an outer sleeve 14. The inner and outer sleeves 12, 14 are formed of metallic materials. The connecting device 10 further includes an elastic body 16 interposed between the inner and outer sleeves 12, 14.

Described in detail, the inner sleeve 12 of the connecting device 10 is a comparatively short cylindrical member having a bore the inside diameter of which is determined so that the end portion of the steering shaft 40 is fixedly fitted in the bore of the inner sleeve 12. A stopper 18 formed of a metallic material is fixedly fitted on an axially intermediate portion of the inner sleeve 12.

As shown in FIG. 1, the stopper 18 has a hexagon shape as seen in cross section taken in a plane perpendicular to the axis of the inner sleeve 2, that is, as seen in the transverse cross sectional view of FIG. 1. The hexagon shape is a generally elongate rectangular shape having a length considerably larger than the outside diameter of the inner sleeve 12. The stopper 18 has a thickness or a dimension in the axial direction of the inner sleeve 12, which thickness is smaller than the axial length of the inner sleeve 12. The stopper 18 has a center bore 20 having a circular cross sectional shape, as shown in FIG. 1. The inner sleeve 12 is inserted through the center bore 20, and is fixed to the stopper 18 by welding or any other suitable means.

The stopper 18 fixedly fitted at its center bore 20 on the axially intermediate portion of the inner sleeve 12 has two integrally formed radial projections 22, 22 extending radially outwardly from the outer circumferential surface of the inner sleeve 12 in diametrically opposite directions of the inner sleeve 12. As shown in FIG. 2, the inner sleeve 12 is provided with a seat 21 provided on its outer circumferential surface, and a tapped hole 23 formed through the cylindrical wall. When the steering shaft 40 is fixedly fitted at its end portion in the inner sleeve 12, a fixing screw 42 is inserted through the seat 21 and screwed into the tapped hole 33, as shown in FIG. 3.

On the other hand, the outer sleeve 14 is a cylindrical member having an inside diameter larger than the length or longitudinal dimension of the stopper 18 (as measured in the diametric direction of the inner and outer sleeves 12, 14), and an axial dimension smaller than that of the inner sleeve 12. The outer sleeve 14 has an outside diameter which is determined so that the outer sleeve 14 is press-fitted in a cylindrical wall 52 of an annular boss 50 formed on the steering wheel 44, as shown in FIG. 3.

The inner sleeve 12 is disposed radially inwardly of, and coaxially with the outer sleeve 14, and an elastic body 16 is interposed between the inner and outer sleeves 12, 14. The elastic body 16 is a generally annular or cylindrical block of a rubber material, having outer and inner circumferential surfaces which are respectively bonded to the inner circumferential of the outer sleeve 14 and the outer circumferential surface of the inner sleeve 12, in the process of vulcanization of the rubber material of the elastic body 16. Thus, the inner and outer sleeves 12, 14 and the elastic body 16 cooperate to constitute a connector assembly wherein the inner and outer sleeves 12, 14 are elastically connected to each other by the elastic body 16 bonded to their outer and inner circumferential surfaces.

The stopper 18 fixed on the outer circumferential surface of the axially intermediate portion of the inner sleeve 18 is almost entirely embedded in the mass of the elastic body 16 elastically connecting the inner and outer sleeves 12, 14, such that the two projections 22 of the stopper 18 extend radially outwardly from the inner sleeve 12, toward respective two circumferential portions of the outer sleeve 14 which are opposed to each other in the diametric direction of the sleeves 12, 14. In the presence of the stopper 18, the elastic body 16 has two arcuate thin-walled portions 24, 24 which are opposed to each other in a first diametric direction of the inner and outer sleeves 12, 14 and each of which is located between the corresponding circumferential portion of the inner surface of the outer sleeve 14 and the end face of the corresponding one of the two radial projections 22, 22. The elastic body 16 further has two substantially semi-cylindrical portions 26, 26 which are opposed to each other in a second diametric direction of the inner and outer sleeves 12, 14 perpendicular to the above-indicated first diametric direction and each of which is located between the corresponding circumferential portion of the inner surface of the outer sleeve 14 and a corresponding one of two pairs of side surfaces of the stopper 18. The two pairs of side surfaces and the end faces of the two radial projections 22, 22 cooperate to define the above-indicated hexagon shape in cross section of the stopper 18. Thus, the elastic body 16 interposed between the inner and outer sleeves 12, 14 consists of the two substantially semi-cylindrical portions 26, 26 formed on the respective opposite sides of the stopper 18 as seen in the cross sectional view of FIG. 1, and the two arcuate thin-walled portions 24, 24, which connect the two substantially semi-cylindrical portions 26, 26 to each other at the diametrically opposite circumferential positions of the outer sleeve 14, and at the radially outermost portion of the elastic body 16.

The elastic body 16 has two voids 28, 28 formed therethrough so as to extend through its entire thickness (through its entire dimension in the axial direction of the inner and outer sleeves 12, 14), as shown in FIG. 2. These two voids 28, 28 are generally U-shaped as seen in the cross sectional view of FIG. 1, and formed so as to surround the end portions of the respective two projections 22, 22 of the stopper 18, as shown in FIG. 1. Namely, each of the two voids 28, 28 consists of one central portion 32 formed between two inner surfaces 30a, 30b of the elastic body 16 which are opposed to each other in the radial direction of the elastic body 16, and two end portions 36, 36 which are located on the opposite sides of the central portion 32 (on the opposite sides of the corresponding thin-walled portion 24) and each of which is formed between two inner surfaces 34a, 34b of the elastic body 16 that are opposed to each other in a rotating or circumferential direction of the steering wheel 44 and the outer sleeve 14.

In the present steering-wheel connecting device 10 wherein the inner and outer sleeves 12, 14 are elastically connected to each other by the elastic body 16, the amount of elastic deformation of each of the two substantially semi-cylindrical portions 26, 26 upon application of a torsional force to the outer sleeve 14 so as to cause rotation of the outer sleeve 14 relative to the inner sleeve 12 is restricted by the two projections 22, 22 of the stopper 18, since the two substantially semi-cylindrical portions 26, 26 are connected to each other at their radially outermost portion by only the two arcuate thin-walled portions 24, 24 and are isolated from each other in the diametric direction by the stopper 18 having the two radial projections 22, 22. Thus, the overall amount of elastic deformation of the elastic body 16 is made smaller by the two projections 22 of the stopper 18, than in the case where the elastic deformation of the elastic body 16 is not at all restricted. Accordingly, the maximum angle of relative rotation of the inner and outer sleeves 12, 14 that can be permitted by the elastic deformation of the elastic body 16 is restricted or reduced. It will be understood that the two projections 22, 22 of the stopper 18 which extend radially outwardly from the inner sleeve 12 in the opposite radial directions constitute relative-rotation restricting means for restricting the amount or angle of relative rotation between the inner and outer sleeves 12, 14. Thus, the connector assembly incorporates the relative-rotation restricting means.

The present connecting device 10 is further arranged such that the maximum angle of relative rotation of the inner and outer sleeves 12, 14 permitted by the elastic deformation of the elastic body 16 can be easily adjusted by simply adjusting the distance between the two opposed inner surfaces 34a, 34b of each of the two end portions 36 of each void 28, which two end portions 36 are formed on the respective opposite sides of the central portion 32 corresponding to each arcuate thin-walled portion 24 of the elastic body 16 and are defined by the end sections of each substantially semi-cylindrical portion 26 of the elastic body 16 that are adjacent to the end portion of the corresponding projection 22 of the stopper 18. That is, the maximum angle of relative rotation of the inner and outer sleeves 12, 14 is defined by abutting contact of the two inner surfaces 34a, 34b which are opposed to each other in the rotating or circumferential direction of the steering wheel 44 and the outer sleeve 14.

In addition, the spring stiffness of the elastic body 16 used in the present connecting device 10 is suitably adjusted, namely, made lower at the two arcuate thin-walled portions 24 in the presence of the central portions 32 of the two voids 28. Further, the inner and outer sleeves 12, 14 are connected to each other by only the elastic body 16, so as to permit relative displacements of the inner and outer sleeves 12, 14 in the axial and radial directions with elastic deformation thereof, upon application of an external force therebetween.

The steering-wheel connecting device 10 constructed as described above is suitably used to connect the steering wheel 44 to the steering shaft 40, as shown in FIG. 3, in the steering system of the vehicle. The steering shaft 40 is rotatably supported by a stationary member in the form of a column tube 38 fixed to the body of the vehicle through a suitable bracket.

Described more specifically, the present connecting device 10 is installed on the vehicle such that the inner sleeve 12 is fitted on the end portion of the steering shaft 40 which extends outwardly from the column tube 38, and is positioned relative to and fixed to the steering shaft 40, with the fixing screw 42 being inserted through the seat 21 on the inner sleeve 12, screwed in the tapped hole 23 formed in the inner sleeve 12, and further screwed into a tapped hole formed in the end portion of the steering shaft 40. Thus, the inner sleeve 12 and the steering shaft 40 are coaxially fixed to each other such that the inner sleeve 12 and the steering shaft 40 are rotatable as a unit.

On the other hand, the outer sleeve 14 is press-fitted in the cylindrical wall 52 of the above-indicated annular boss 50, which is connected to a rim portion 46 of the steering wheel 44 through a spoke portion 48. Thus, the outer sleeve 14 and the steering wheel 44 are coaxially fixed to each other such that the outer sleeve 14 and the steering wheel 44 are rotatable as a unit.

In the present embodiment, the connecting device 10 is interposed between the steering shaft 40 and the steering wheel 44 such that the two voids 28, 28 formed in the elastic body 16 are spaced apart from each other in a direction substantially parallel to the vertical direction, as shown in FIG. 3, when the steering wheel 44 is placed at its neutral position. In other words, the inner and outer sleeves 12, 14 are rotatably fixed to the steering shaft 40 and the steering wheel 44, respectively, such that the two projections 28, 28 extend in a direction substantially parallel to the vertical direction.

Thus, the inner and outer sleeves 12, 14 of the present connecting device 10 are respectively fixed to the steering shaft 40 and the steering wheel 44 such that the inner sleeve 12 and the steering shaft 40 are rotatable as a unit while the outer sleeve 14 and the steering wheel 44 are rotatable as a unit, and such that the steering wheel 44 is elastically connected to the steering shaft 40 by only the elastic body 16 interposed between the inner and outer sleeves 12, 14.

With the connecting device 10 interposed between the steering shaft 40 and the steering wheel 44 such that the two voids 28, 28 formed in the elastic body 16 are spaced apart from each other substantially in the vertical direction, the elastic body 16 exhibits a soft spring characteristic, namely, a sufficiently reduced spring stiffness with respect to an external or vibrational load applied between the inner and outer sleeves 12, 14 in the vertical direction, while the steering wheel 44 and the steering shaft 40 are elastically connected to each other through only the elastic body 16.

Since the inner and outer sleeves 12, 14 are connected to each other by only the elastic body 16, the elastic body 16 is permitted to undergo a sufficiently large amount of overall elastic deformation upon application of an external force between the inner and outer sleeve 12, 14 so as to displace these sleeves relative to each other in the axial or radial direction. Accordingly, the elastic body 16 is easily deformed upon application of an external force between the steering shaft 40 and the steering wheel 44 so as to displace these members in the axial direction.

On the other hand, the two radial projections 22, 22 of the stopper 18 function to restrict the amount of relative rotation of the inner and outer sleeves 12, 14 based on the elastic deformation of the elastic body 16 upon application of a torsional force to the outer sleeve 14 so as to rotate the outer sleeve 14 relative to the inner sleeve 12. Accordingly, the amount of relative rotation between the steering wheel 44 and the steering shaft 40 is restricted by the two radial projections 22, 22.

In the present embodiment, the steering wheel 44 is elastically connected, by only the elastic body 16 and through the inner and outer sleeves 12, 14, to the steering shaft 40 rotatably supported by the column tube 38 fixed to the vehicle body. When a vibration of the vehicle body is transmitted to the steering shaft 40 through the column tube 38, the vibration of the steering shaft 40 can be effectively absorbed by the elastic deformation of the elastic body 16 which exhibits a sufficiently soft spring characteristic with respect to the vibration applied thereto in the vertical direction and which are designed to be able to undergo a sufficiently large amount of elastic deformation even in radial directions other than the vertical direction. Accordingly, the transmission of the vibration from the steering shaft 40 to the steering wheel 44 can be minimized or prevented by the simple arrangement in which the steering wheel 44 and the steering shaft 40 are elastically connected to each other by only the elastic body 16.

In the present connecting device 10 wherein the amount of relative rotation of the steering wheel 44 and the steering shaft 40 is restricted by the stopper 18 having the two radial projections 22, 22, the elastic body 16 connecting the steering wheel 44 and the steering shaft 40 exhibits a comparatively high spring stiffness after the amount of rotation of the steering wheel 44 relative to the steering shaft 40 has increased to a critical value at which the two opposed inner surfaces 34a, 34b of the elastic body 16 come into contact with each other.

The present connecting device 10 constructed as described above is simple in construction, but assures elastic connection between the steering wheel 44 and the steering shaft 40, so as to permit sufficient reduction of the magnitude of the vibration transmitted from the vehicle body to the steering wheel 44 through the steering shaft 40, without deteriorating the maneuverability of the steering wheel 44 and without a delay in the transmission of a rotary motion of the steering wheel 44 to the steering shaft 40. The present connecting device 10 makes it possible to effectively minimize or prevent the vibration of the steering wheel 44 connected to the steering shaft 40, without such problems.

The present connecting device 10 may be used in a steering system of a type in which the steering wheel 44 is not connected to the steering shaft 40, but is merely rotatably supported by the vehicle body through a suitable rotary member, and an actuator to change the angle of steerable wheels of the vehicle is controlled by an electronic controller according to a rotary motion of the steering wheel 44. In this case, too, the connecting device 10 is effective to minimize the magnitude of the vibration transmitted from the vehicle body to the steering wheel 44.

The present embodiment is further arranged to permit easy adjustment of the maximum angle of relative rotation of the inner and outer sleeves 12, 14 that is permitted by the elastic deformation of the elastic body 16. That is, the maximum angle of the relative rotation can be easily adjusted by suitably determining the size of each end portion 36 of each of the two voids 28 formed in the elastic body 16, as described above. In other words, the end portions 36 of each void 28 are suitably dimensioned so as to establish the desired maximum angle of rotation of the steering wheel 44 relative to the steering shaft 40, that is, an optimum amount of play of the steering wheel 44 in its rotating direction.

In the present connecting device 10, the outer sleeve 14 to be fixed to the steering wheel 44 is elastically connected to the inner sleeve 12 to be fixed to the steering shaft 40, by the elastic body 16 radially interposed between the inner and outer sleeves 12, 14 such that the elastic body 16 is disposed within the axial length of the outer sleeve 14, and such that the outer sleeve 14 is positioned within the axial length of the inner sleeve 12. This arrangement is effective to reduce the required axial dimension of the connecting device 10, and accordingly reduce the size of the steering system including the steering shaft 40 and the steering wheel 44 which are elastically connected to each other by the connecting device 10. In this respect, it is noted that the required axial dimension of the connecting device 10 would be larger if the inner and outer sleeves 12, 14 are spaced apart from each other in their axial direction and connected to each other by the elastic body 16 which is axially interposed between the inner and outer sleeves 12, 14.

Figure 4:
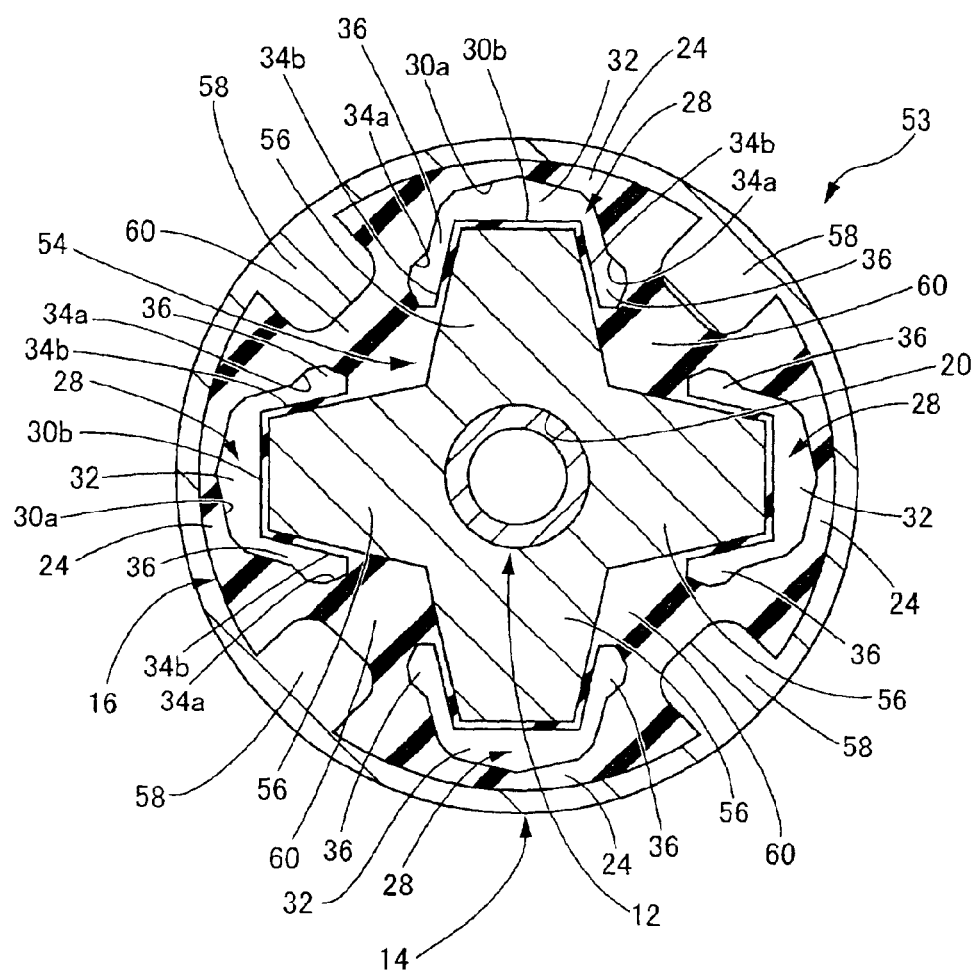
FIG. 4 is a view corresponding to that of FIG. 1, showing a steering-wheel connecting device according to a second embodiment of this invention.

Referring next to FIG. 4, there is shown a steering-wheel connecting device 53 wherein relative-rotation restricting means for restricting the amount or angle of relative rotation between the inner and outer sleeves 12, 14 that is permitted by the elastic deformation of the elastic body 16 is different from that used in the first embodiment, namely, the relative-rotation restricting means in the form of the two radial projections 22, 22 of the stopper. In this second embodiment of FIG. 4 and the following embodiments of FIGS. 5–13, the same reference signs as used in the first embodiment of FIGS. 1–3 will be used to identify the functionally corresponding elements, which will not be described in detail to avoid redundancy of description.

The connecting device 53 of FIG. 4 includes a stopper 54 in the form of a crisscross block having the center hole 20. The stopper 54 is fitted at the center hole 20 on the inner sleeve 12, and is fixed to the inner sleeve 12 by welding or any other fixing means such that the stopper 54 is rotatable with the inner sleeve 12. The stopper 54 has four integrally formed radial projections 56 extending radially outwardly from the outer circumferential surface of an axially intermediate portion of the inner sleeve 12, such that the four radial projections 56 are equally spaced from each other by an angular interval of 90° in the circumferential direction of the inner sleeve 12.

The outer sleeve 14 is provided with four integrally formed radial projections 58 extending radially inwardly from its inner circumferential surface. The four radial projections 58 extend in the axial direction of the outer sleeve 14 over its entire axial length, and are equally spaced from each other by an angular interval of 90° in the circumferential direction of the outer sleeve 14.

The inner sleeve 12 provided with the stopper 54 and the outer sleeve 14 provided with the radial projections 58 are elastically connected to each other by the elastic body 16 interposed therebetween such that the inner and outer sleeves 12, 14 are coaxial with each other and bonded at their outer and inner circumferential surfaces to the respective inner and outer surfaces of the generally annular elastic body 16, and such that each of the four radial projections 56 of the stopper 54 is positioned between the corresponding two adjacent ones of the four radial projections 58 of the outer sleeve 14.

In the connecting device 53 of the second embodiment wherein the inner and outer sleeves 12, 14 are elastically connected to each other by the elastic body 16, as in the first embodiment, the elastic body 16 has four thick-walled portions 60 which are spaced apart from each other by the four radial projections 56 of the stopper 54, and four arcuate thin-walled portions 24 which are located between the end faces of the respective four radial projections 56 and the corresponding circumferential portions of the inner circumferential surface of the outer sleeve 14.

The four radial projections 56 of the stopper 54 function to restrict the maximum amount of elastic deformation of the thick-walled portions 60 of the elastic body 16, and accordingly restrict the maximum amount or angle of rotation of the outer sleeve 14 relative to the inner sleeve 12 that is permitted by the elastic deformation of the thick-walled portions 60, when a torsional force is applied to the outer sleeve 14 so as to rotate the outer sleeve 14 relative to the inner sleeve 12. In addition, the radial projections 58 formed on the inner circumferential surface of the outer sleeve 16 also function to restrict the maximum amount or angle of the relative rotation of the inner and outer sleeves 12, 14, with each radial projections 58 being held in pressing contact with the corresponding radial projection 56 via a part of the corresponding thick-wall portion 60 of the elastic body 16. It will be understood that the four radial projections 56 of the stopper 54 fitted on the outer circumferential surface of the inner sleeve 12 and the four radial projections 58 formed on the inner circumferential surface of the outer sleeve 14 cooperate with each other to constitute the relative-rotation restricting means for restricting the amount of the relative rotation of the inner and outer sleeves 12, 14. Thus, the connector assembly incorporates the relative-rotation restricting means.

In the present connecting device 53, four voids 28 are formed between the respective four arcuate thin-walled portions 24 of the elastic body 16 and the corresponding radial projections 56 such that the four voids 28 are equally spaced from each other by an angular interval of 90 in the circumferential direction of the elastic body 16, and such that each of the voids 28 consists of the central portion 32 partially defined by the corresponding arcuate thin-walled portion 24, and the two end portions 36 partially defined by the adjacent two thick-walled portions 60.

Like the connecting device 10 of the first embodiment, the connecting device 53 of the second embodiment constructed as described above is installed on the vehicle such that the inner sleeve 12 is fixedly fitted on the end portion of the steering shaft 40, while the outer sleeve 14 is press-fitted in the cylindrical wall 52 of the annular boss 50 of the steering wheel 44. Thus, the inner and outer sleeves 12, 14 are coaxially fixed to the steering shaft 40 and the steering wheel 44, respectively, such that the inner and outer sleeves 12, 14 are rotatable with the steering shaft and wheel 44, 40, respectively.

In the connecting device 53 interposed between the steering shaft 40 and the steering wheel 44 which are fixed to the respective inner and outer sleeves 12, 14, the elastic body 16 connecting the inner and outer sleeves 12, 14 is positioned in its circumferential direction such that the two voids 28 are spaced apart from each other in the vertical direction, while the other two voids 28 are spaced apart from each other in the horizontal direction.

The connecting device 53 of the present second embodiment arranged to elastically connect the steering wheel 44 and the steering shaft 40 to each other through only the elastic body 16 is effective to reduce or minimize the amount of transmission of the vibration from the vehicle body to the steering wheel 44 through the steering shaft 40. Further, the present connecting device 53 does not require the steering wheel 44 to have a complicated construction.

In addition, the elastic body 16 exhibits a sufficiently reduced spring stiffness with respect to not only a vibrational load applied to the connecting device 10 in the vertical direction, but also a vibrational load applied to the connecting device 10 in the horizontal direction, since the four voids 28 formed in the elastic body 16 are located at the respective upper, lower, right and left positions while the connecting device 10 is installed so as to connect the steering wheel 44 to the steering shaft 40. Accordingly, the magnitude of the vibration transmitted from the steering shaft 40 to the steering wheel 44 can be more effectively reduced.

Further, the maximum amount of rotation of the outer sleeves 14 relative to the inner member 12 upon application of a torsional force to the outer sleeve 14 so as to cause the relative rotation of these members 12, 14 is restricted to determine the maximum amount of rotation of the steering wheel 44 relative to the steering shaft 40. Namely, the torsional spring stiffness of the elastic body 16 is increased to permit the steering shaft 40 to rotate with the steering wheel 44 after the steering wheel 44 has been rotated relative to the steering shaft 40 by a predetermined angle. Therefore, the present connecting device 53 permits intended damping of the vibration of the steering wheel 44, without deteriorating the maneuverability of the steering wheel 44 and the operating response of the steering system (without a delay in the transmission of a rotary motion of the steering wheel 44 to the steering shaft 40).

The present connecting device 53 has substantially the same advantages as provided by the connecting device 10 of the first embodiment, particularly owing to the arrangement wherein the steering wheel 44 fixed to the outer sleeve 14 and the steering shaft 40 fixed to the inner sleeve 12 are elastically connected to each other by only the elastic body 16, which has the four voids 28 each having the central portion 32 and the two end portions 36.

Figure 5:
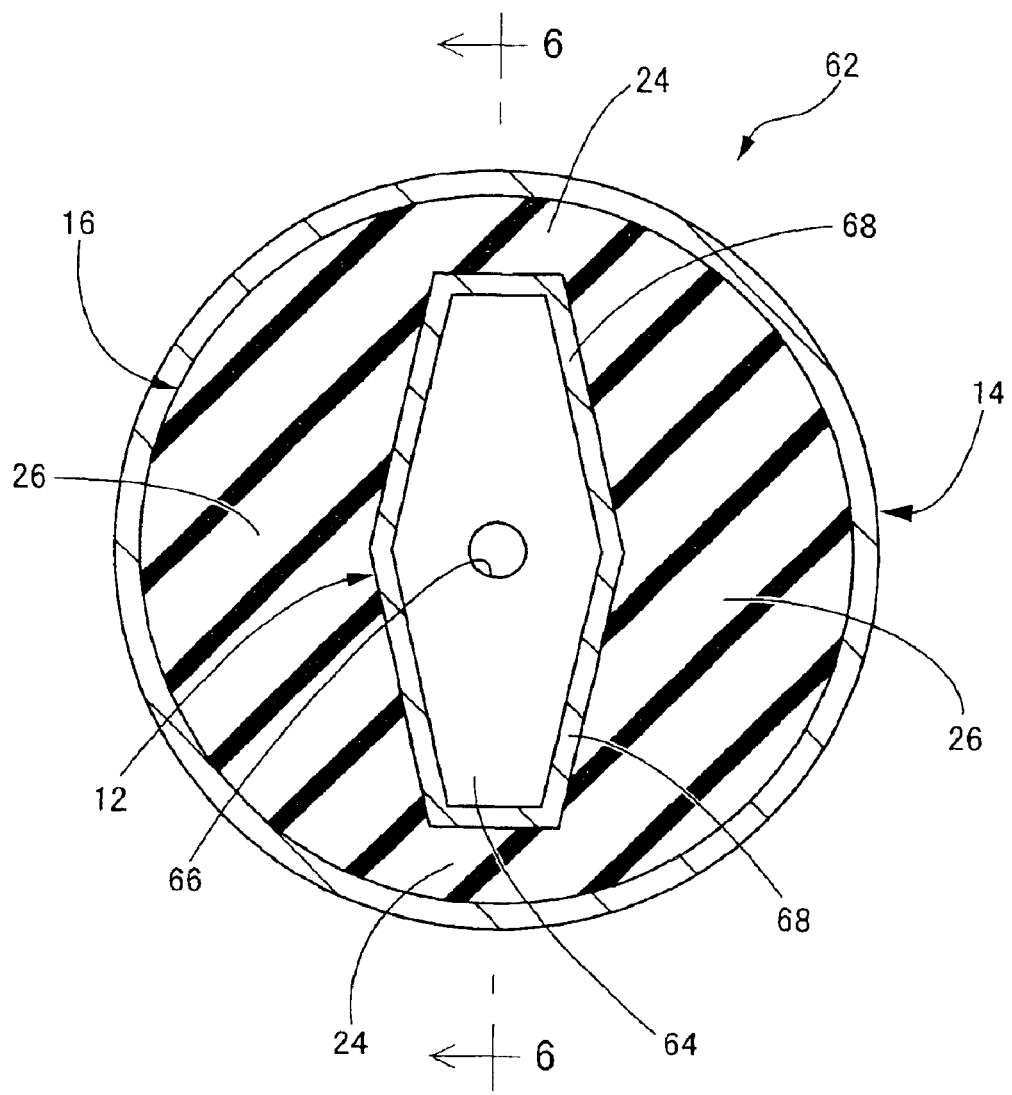
FIG. 5 is a view corresponding to that of FIG. 1, showing a steering-wheel connecting device according to a third embodiment of this invention.
Figure 6:
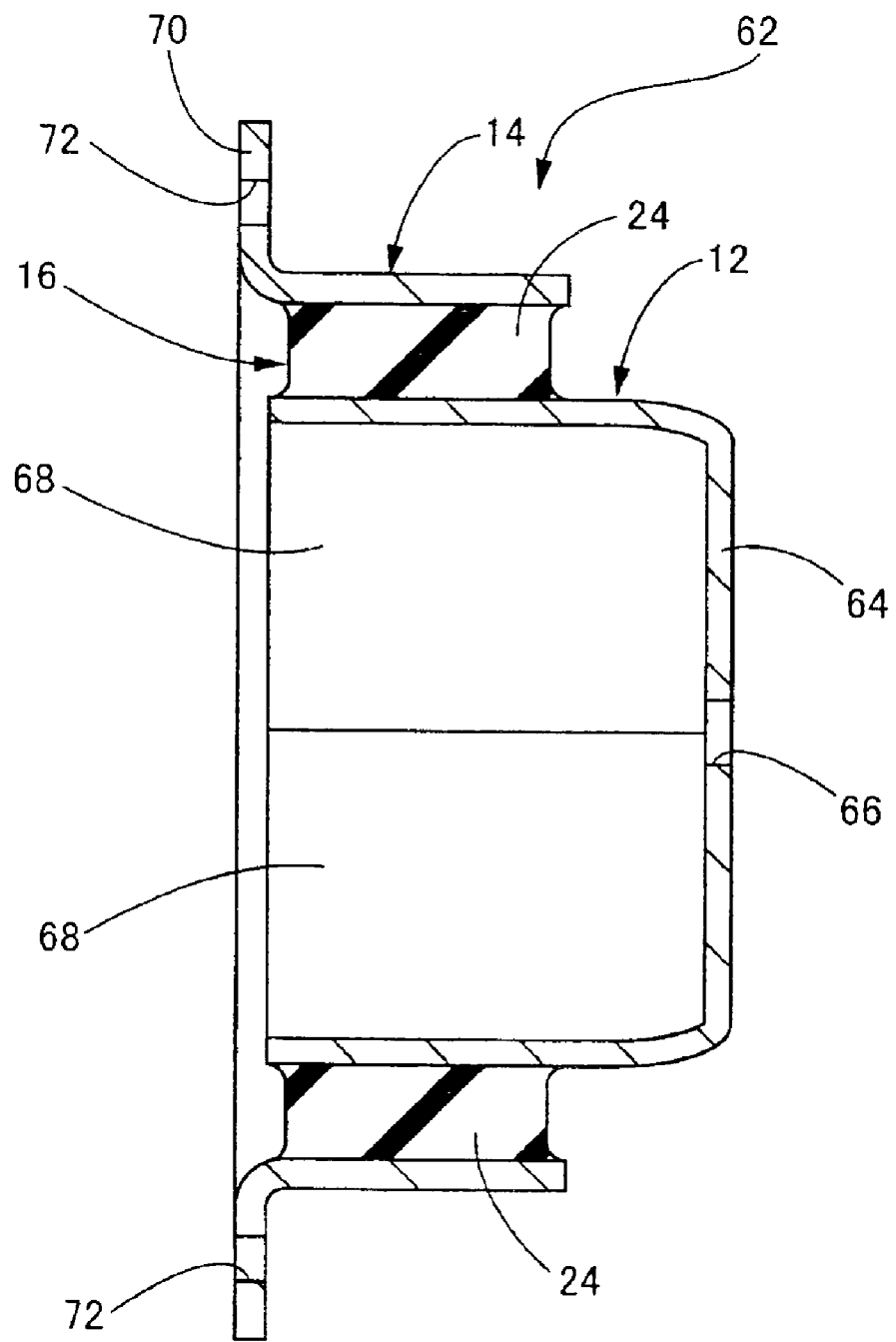
FIG. 6 is a cross sectional view of the steering-wheel connecting device taken along line 6—6 of FIG. 5.
Figure 7:
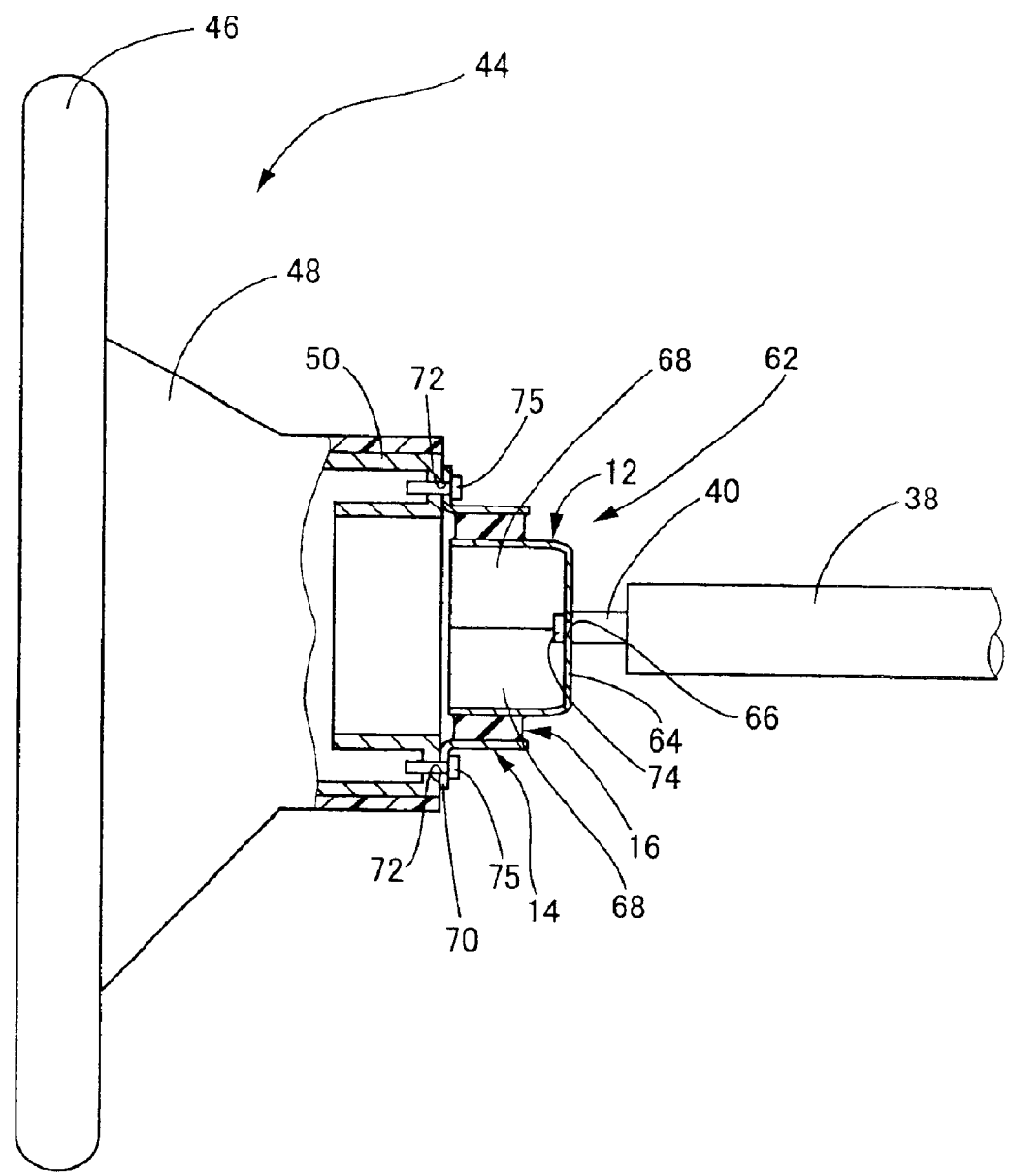
FIG. 7 is a view corresponding to that of FIG. 3, showing the steering-wheel connecting device of FIG. 5 connecting the steering wheel to the steering shaft.

Referring further to FIGS. 5–7, there will be described a steering-wheel connecting device 62 constructed according to a third embodiment of the present invention, which is more or less different in construction from the connecting devices 10, 53 of the first and second embodiments.

The present connecting device 62 uses the inner member 12 in the form of a hollow hexagonal member which is open at one of its opposite axial ends and closed at the other axial end by a bottom wall 64 having a center hole 66. This inner member 12 has a hexagonal shape in transverse cross section as seen in FIG. 5. The hexagonal shape of the inner member 12 is generally elongate in the diametric direction of the outer sleeve 14, and is more or less similar to an elongate rectangle. That is, the inner member 12 has side walls in the form of two radial projections 68 extending from its axis (aligned with the center hole 66) in the opposite directions. These side walls or radial projections 68 cooperate with the bottom wall 64 to define the hexagonal hollow of the inner member 12.

On the other hand, the outer sleeve 14 has an inside diameter considerably larger than a longitudinal dimension of the inner member 12 (a distance between the end faces of the two radial projections 68), and an axial dimension or length smaller than that of the inner member 12. The outer sleeve 14 has an integrally formed outward flange 70 formed at one of its opposite axial ends such that the outward flange 70 extends in the radially outward direction. The outward flange 70 has four through-holes 72 formed therethrough.

The inner member 12 and the outer member in the form of the outer sleeve 14 are elastically connected to each other by only the elastic body 16 such that the axial of the inner member 12 which passes the center hole 66 is aligned with the axis of the outer sleeve 14, and such that the outer side surfaces of the hexagonal inner member 12 (radial projections 68) are bonded to the inner surface of the elastic body 16 while the inner circumferential surface of the outer sleeve 14 is bonded to the outer circumferential surface of the elastic body 16.

In the present connecting device 62 wherein the inner member 12 has the two radial projections 68, the elastic body 16 is substantially divided or isolated by the radial projections 68 into the two substantially semi-cylindrical portions 26, as in the connecting device 10 of the first embodiment.

The two radial projections 68 of the inner member 12 function to restrict the maximum amount of elastic deformation of the substantially semi-cylindrical portions 26 of the elastic body 16 when a torsional force is applied to the outer sleeve 14 so as to rotate the outer sleeve 14 relative to the inner member 12. It will be understood that the radial projections 68 of the inner member 12 function as relative-rotation restricting means for restricting the maximum amount of relative rotation between the outer sleeve 14 and the inner member 12. Thus, the connector assembly incorporates the relative-rotation restricting means.

The connecting device 62 constructed as described above is installed on the vehicle, as shown in FIG. 7, such that the inner member 12 is fixed to the end face of the steering shaft 40, with a fixing screw 74 screwed through the center hole 66 into the end portion of the steering shaft 40, while the outer sleeve 14 is fixed to the end face of the boss annular boss 50 remote from the rim 46 of the steering wheel 44, with fixing screws 75 screwed through the through-holes 72 into the end portion of the annular boss 50. Thus, the inner member 12 and the outer sleeve 14 are respectively fixed to the steering shaft 40 and the steering wheel 44 such that the inner member 12 and the steering shaft 40 are rotatable as a unit 40 while the outer sleeve 14 and the steering wheel 44 are rotatable as a unit.

As described above, the connecting device 62 according to the present embodiment is arranged to elastically connect the steering wheel 44 to the steering shaft 40 through only the elastic body 16, so as to restrict the maximum amount or angle of relative rotation of the inner member 12 and the outer sleeve 14 upon application of a torsional force to the outer sleeve 14 so as to cause the rotation of the outer sleeve 14 relative to the inner member 12, so that the transmission of the vibration from the vehicle body to the steering wheel 44 through the steering shaft 40 is reduced or prevented, without requiring the steering wheel 44 to have a complicated construction, and without deteriorating the maneuverability of the steering wheel 44 and the steering response of the steering system, as in the first and second embodiments described above.

Further, the two radial projections 68 which substantially divide or isolate the elastic body 16 into the two substantially semi-cylindrical portions 26 and which function to restrict the amount of relative rotation of the inner member 12 and the outer sleeve 14 are provided by the inner member 12 which is a hollow hexagonal body, so that the weight of the connecting device 62 can be significantly reduced, as compared with that of a connecting device using a solid stopper having radial projections, and the construction of the connecting device 62 can be simplified, as compared with that of a connecting device wherein the inner member is provided with a separate stopper or stopper projections.

Figure 8:
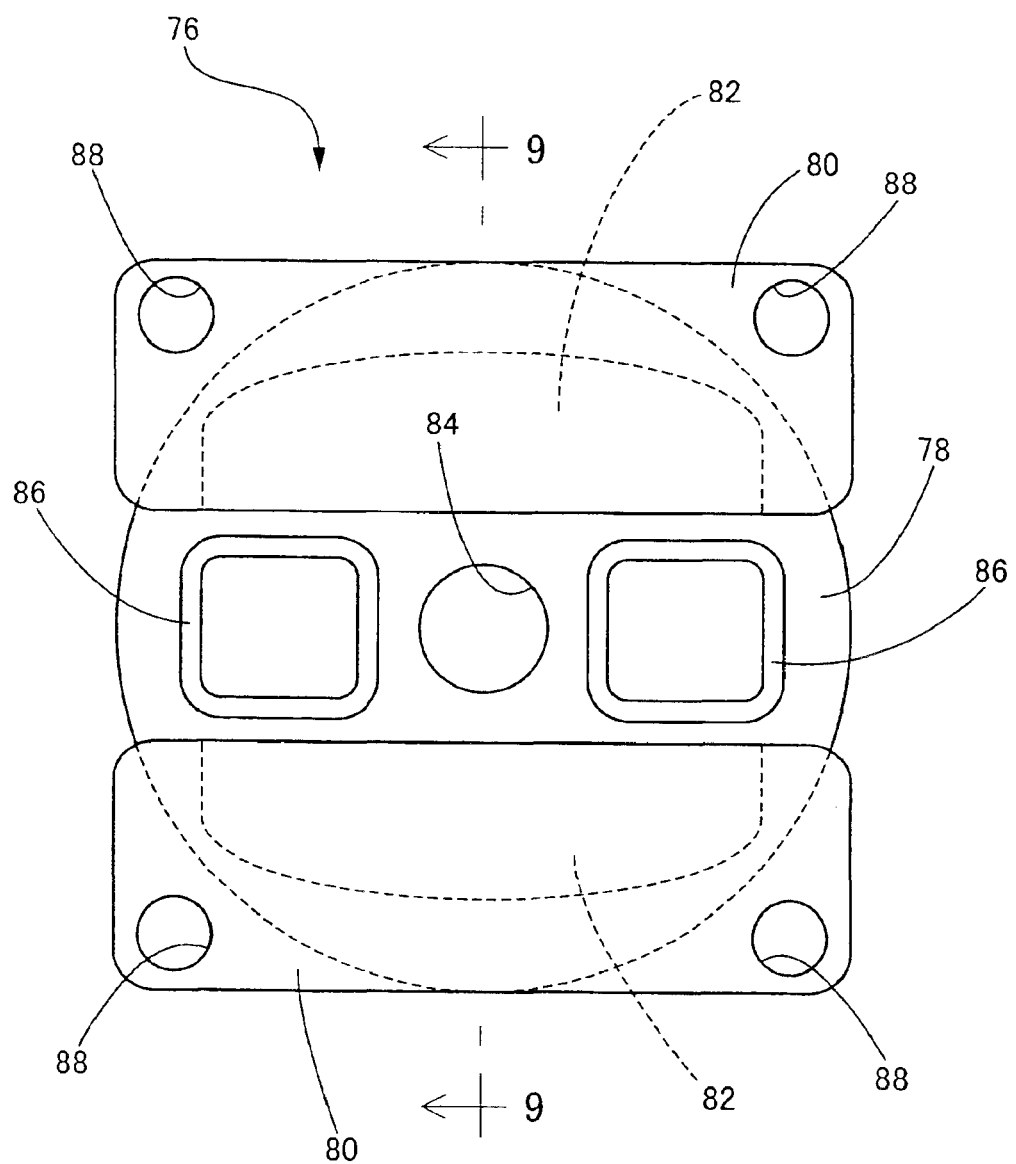
FIG. 8 is a front elevational view of a steering-wheel connecting device according to a fourth embodiment of this invention.
Figure 9:
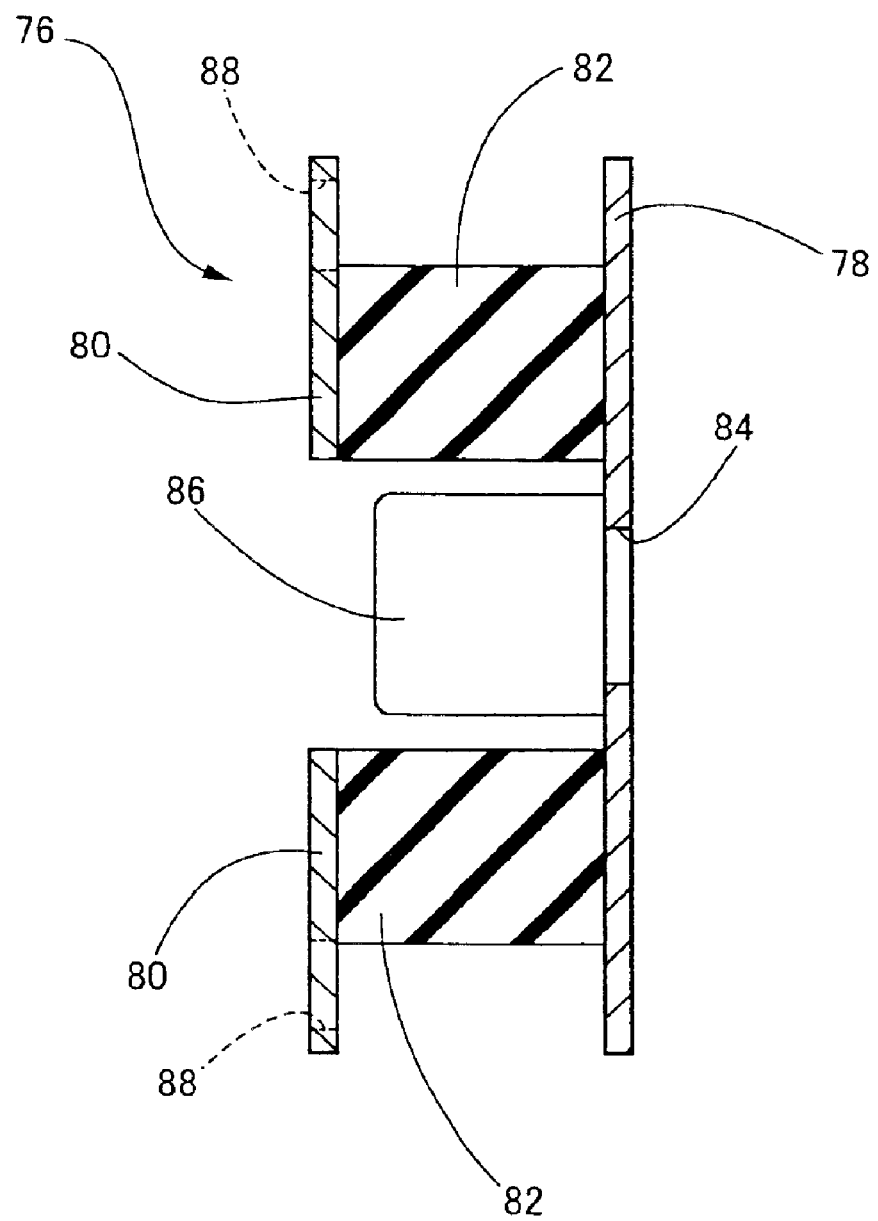
FIG. 9 is a cross sectional view of the steering-wheel connecting device taken along line 9—9 of FIG. 8.
Figure 10:
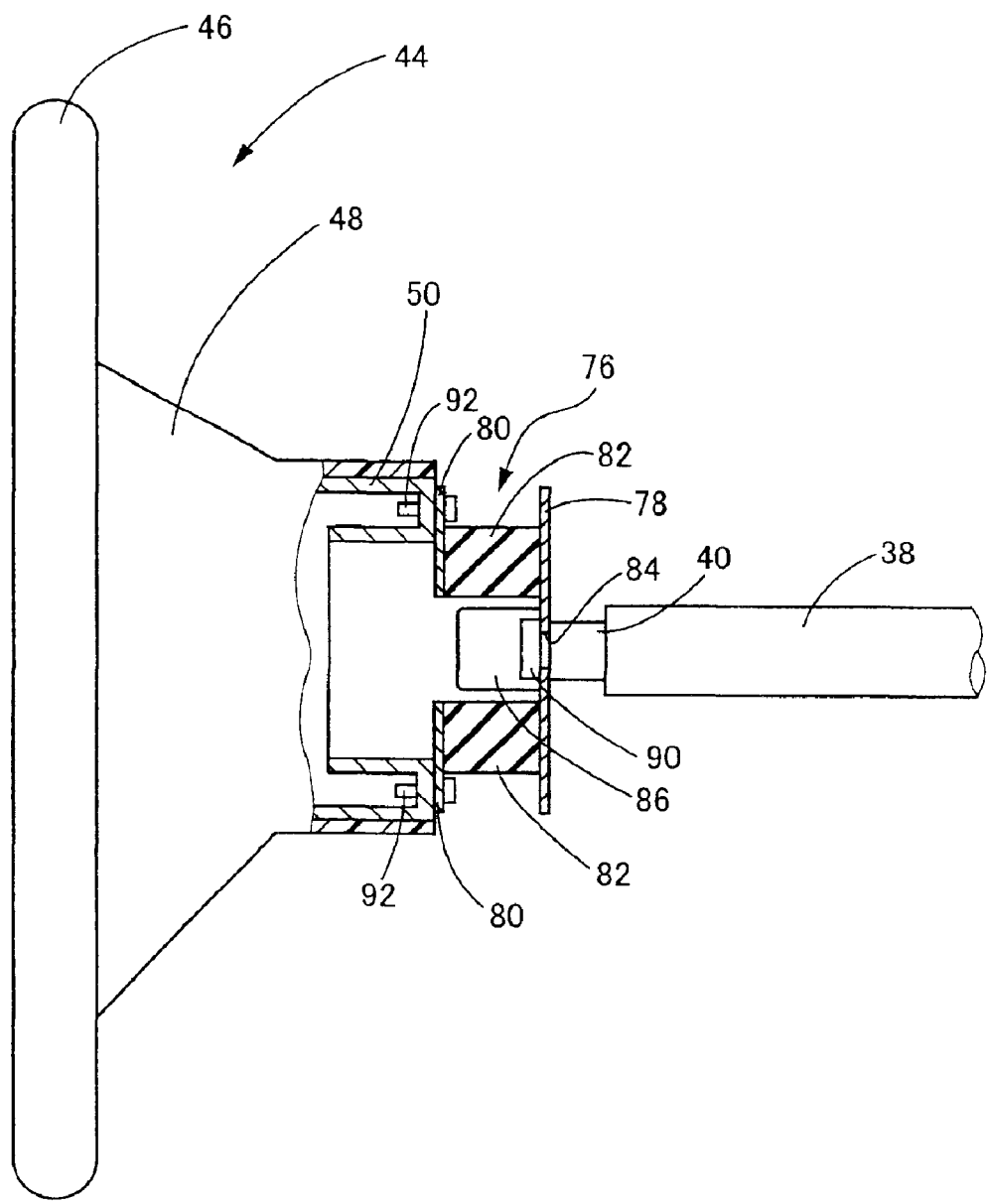
FIG. 10 is a view corresponding to that of FIG. 3, showing the steering-wheel connecting device of FIG. 8 connecting the steering wheel to the steering shaft.

Referring next to FIGS. 8–10, there will be described a steering-wheel connecting device 76 constructed according to a fourth embodiment of the present invention, which is more or less different in construction from the connecting devices 10, 53, 62 of the first, second and third embodiments.

The present connecting device 76 includes a first member or a first planar member in the form of a first plate 78 formed of a metallic material, a second member or a second planar member in the form of two second plates 80, 80 also formed of a metallic material, and an elastic body in the form of two elastic members 82, 82 interposed between the first plate 78 and the second plates 80.

Described in detail, the first plate 78 of the connecting device 76 is a circular plate having an outside diameter considerably larger than that of the steering shaft 40. The first plate 78 has a circular center hole 94, and two axial stopper projections 86, 86 of generally rectangular box construction integrally formed on one of its opposite circular surfaces such that the two axial stopper projections 86 are located at respective radially intermediate positions on opposite sides of the center hole 84. The two axial stopper projections 86 are spaced apart from each other in the diametric direction of the circular first plate 78, and have a suitable height from the above-indicated circular surface of the first plate 78.

Each of the two second plates 80 is a generally elongate rectangular plate having a length substantially equal to the diameter of the first plate 78, and a width equal to about one third of the diameter. Each second plate 80 has two through-holes 88 formed in respective two adjacent corner portions thereof that are spaced apart from each other in the direction of its length, as shown in FIG. 8.

Each of the two elastic members 82 interposed between the first plate 78 and the two second plates 80 is a generally rectangular block having a width equal to about a half of that of the second plates 80, a length smaller than that of the second plates 80, and a thickness or height larger than the height of the stopper projections 86.

In the present connecting device 76, the first plate 78 and the second plates 80 are elastically connected to each other by the two elastic members 82, 82 such that the two second plates 80 are spaced apart from the first plate 78 by a distance larger than the height of the axial stopper projections 86, as shown in FIG. 9, and are positioned parallel to each other while being spaced apart from each other, with the stopper projections 86 interposed therebetween, as shown in FIG. 8, in a direction perpendicular to the direction in which the two stopper projections 86 are spaced apart from each other. Further, the two second plates 80 are spaced apart from the stopper projections 86 in the above-indicated direction. The first plate 78 and the two second plates 80 are bonded at their opposed surfaces to the opposite surfaces of each elastic member 82 in the process of vulcanization of the rubber material to form the elastic member 82. Thus, the first plate 78 and the two second plates 80 are elastically connected to each other by only the two elastic members 82, 82, to form the connecting device 76. The thus constructed connecting device 76 has the four through-holes 88 at the respective four corner portions, with each second plate 80 having the two through-holes 88, 88.

In the connecting device 76 according to the fourth embodiment, each of the elastic members 82 is brought into abutting contact with the axial stopper projections 86, to thereby restrict the amount of elastic deformation of the elastic members 82, when a torsional force is applied to the second plates 80 so as to cause rotation of the second plates 80 relative to the first plate 78 about the axis of the first plate 78. Thus, the two axial stopper projections 86 formed on the first plate 78 function as relative-rotation restricting means for restricting the maximum amount or angle of rotation of the second plates 80 relative to the first plate 78, which is permitted by the elastic deformation of the elastic members 82. Thus, the connector assembly incorporates the relative-rotation restricting means.

The connecting device 76 constructed as described above is installed on the vehicle such that the first plate 78 is coaxially fixed to the steering shaft 40, such that the circular surface of the first plate 78 opposite to the circular surface on which the stopper projections 86 are formed is held in contact with the end face of the steering shaft 40. The first plate 78 is fixed to the steering shaft 40 with a fixing screw 90 screwed through the center hole 84 into the end portion of the steering shaft 40, so that the steering shaft 40 and the first plate 78 are rotatable as a unit. On the other hand, the two second plates 80, 80 are fixed to the annular boss 50 of the steering wheel 44, such that the surfaces of the second plates 80 remote from the first plate 78 are held in contact with the end face of the annular boss 50 remote from the rim portion 46. The second plates 80 are fixed to the steering wheel 44 with fixing screws 92 screwed through the through-holes 88 into the end portion of the annular boss 50, so that the steering wheel 44 and the second plates 80 are rotatable as a unit.

As described above, the connecting device 76 of the fourth embodiment is arranged to elastically connect the steering wheel 44 to the steering shaft 40 by only the two elastic members 82, so as to restrict the maximum amount of rotation of the second plates 80 relative to the first plate 78 about the axis of the first plate 78 upon application of a torsional force to the second plates 80 so as to cause the rotation of the second plates 80 relative to the first plate 78, so that the transmission of the vibration from the vehicle body to the steering wheel 44 through the steering shaft 40 is reduced or prevented, without requiring the steering wheel 44 to have a complicated construction, and without deteriorating the maneuverability of the steering wheel 44 and the steering response of the steering system, as in the first through third embodiments described above.

Further, the two elastic members 82 interposed between the first plate 78 and the second plates 80 are spaced apart from the two axial stopper projections 86 formed on the first plate 78. When the elastic members 82 are elastically deformed upon application of a torsional force to the second plates 80 so as to cause rotation of the second plates 80 relative to the first plate 78 about the axis of the first plate 78, the elastic members 82 are brought into abutting contact with the axial stopper projections 86, so that the maximum amount or angle of rotation of the second plates 80 relative to the first plate 78 is restricted. Thus, the present connecting device 76 is arranged to permit easy adjustment of the maximum angle of rotation of the second plates 80 relative to the first plate 78, by suitably determining the spacing distance between each elastic member 82 and the stopper projections 86. In other words, the stopper projections 86 are suitably positioned relative to the second plates 80, so as to establish the desired maximum angle of rotation of the steering wheel 44 relative to the steering shaft 40, that is, an optimum amount of play of the steering wheel 44 in its rotating direction.

Figure 11:
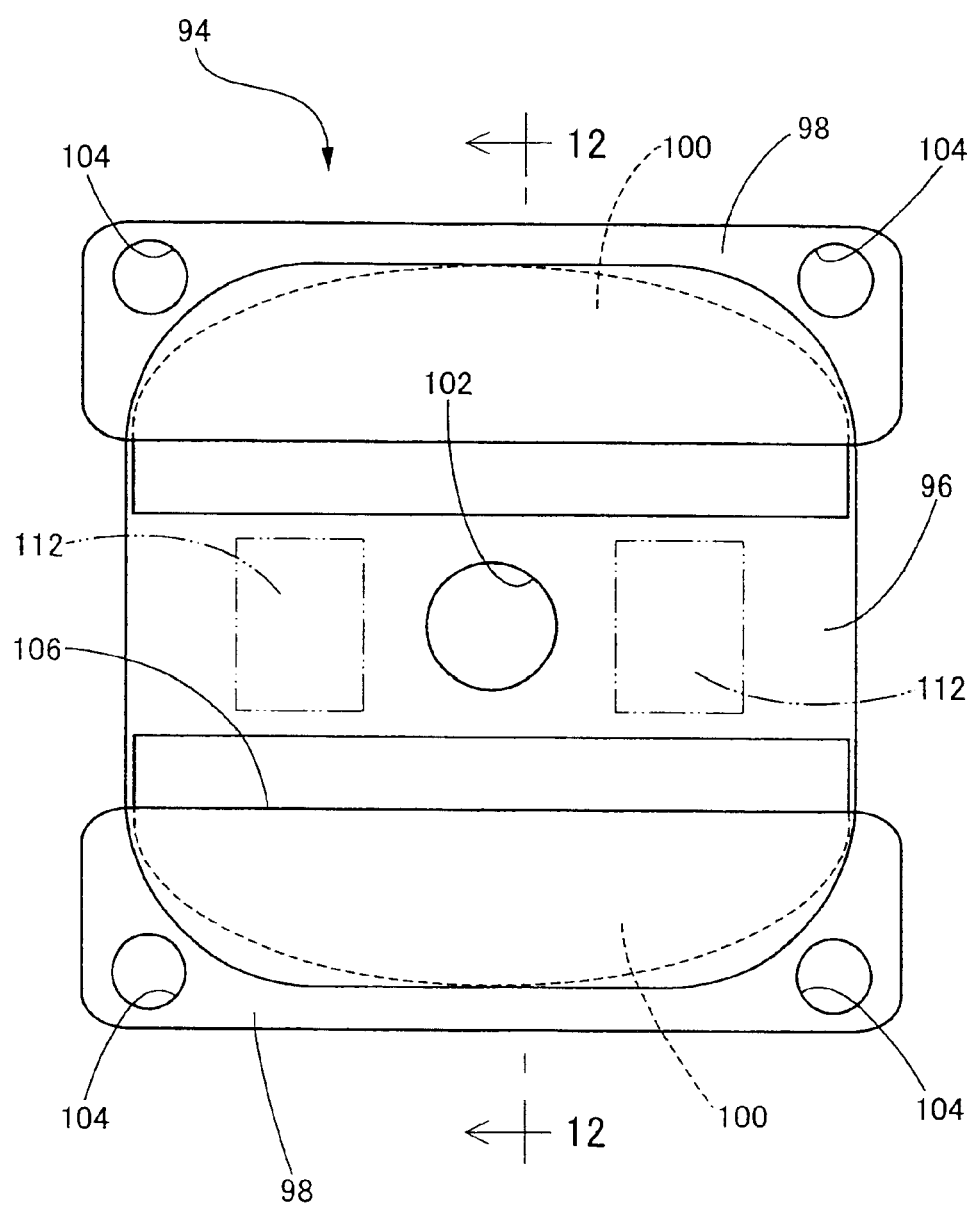
FIG. 11 is a front elevational view of a steering-wheel connecting device according to a fifth embodiment of this invention.
Figure 12:
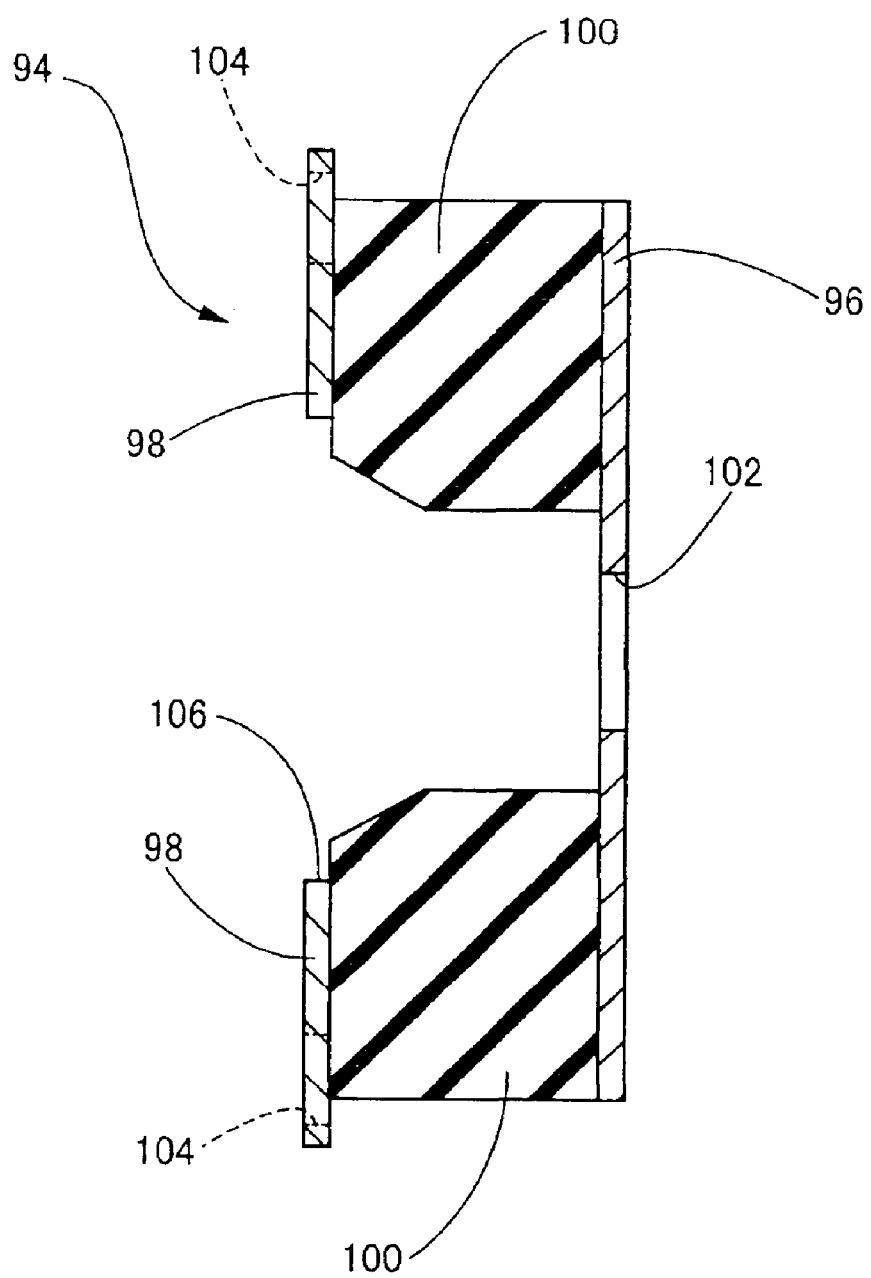
FIG. 12 is a cross sectional view of the steering-wheel connecting device taken along line 12—12 of FIG. 11.
Figure 13:
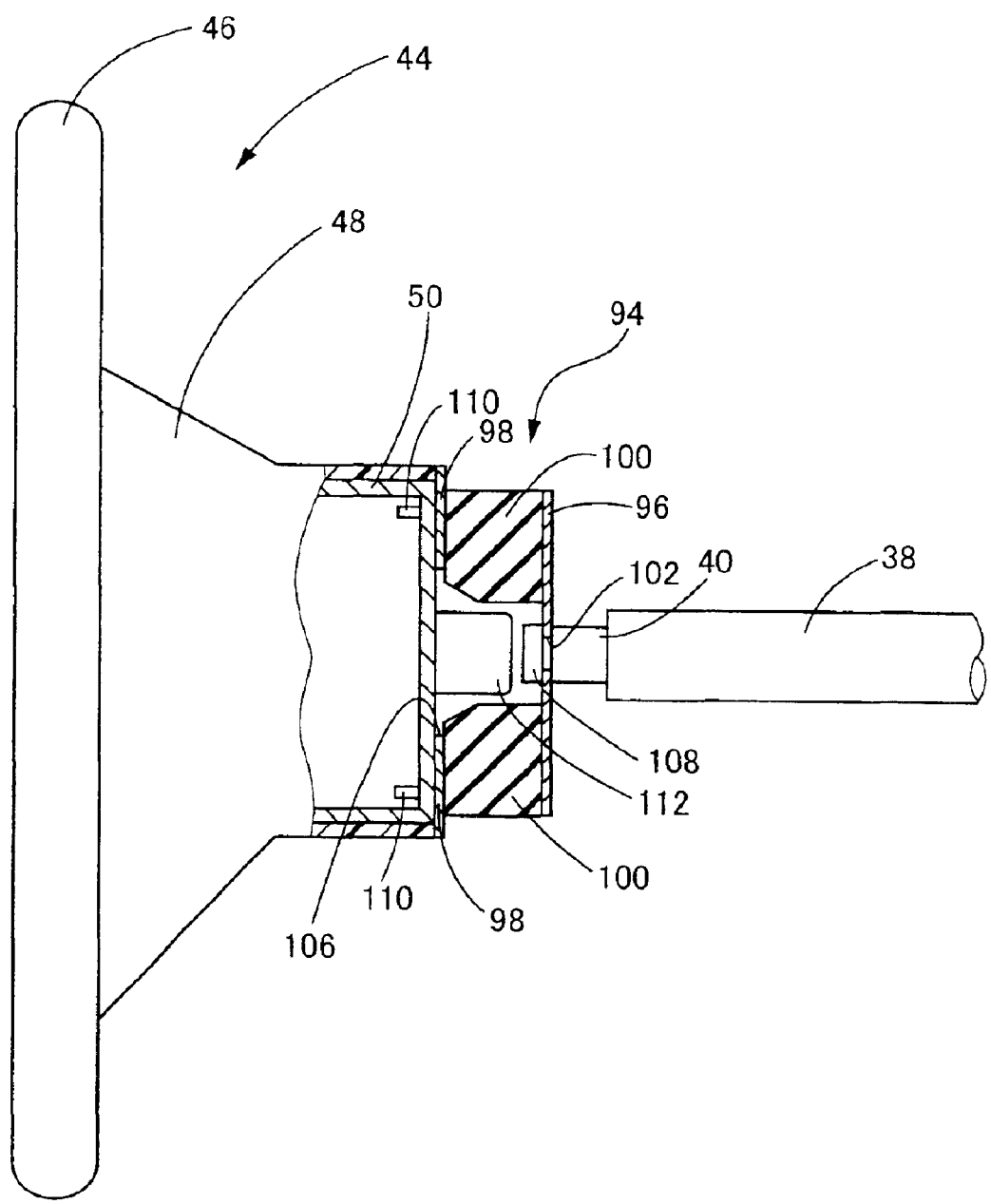
FIG. 13 is a view corresponding to that of FIG. 3, showing the steering-wheel connecting device of FIG. 11 connecting the steering wheel to the steering shaft.

Reference is now made to FIGS. 11–13 showing a steering-wheel connecting device 94 according to a fifth embodiment of the invention, which is different from the connecting devices of the first through fourth embodiments described above.

The connecting device 94 includes a first member or a first planar member in the form of a first plate 96 formed of a metallic material, a second member or a second planar member in the form of two second plates 98 formed of a metallic material, and an elastic body in the form of two elastic members 100, 100 interposed between the first plate 96 and the second plates 98.

Described in detail, the first plate 96 of the connecting device 94 is a generally rectangular plate having a length (a horizontal dimension as seen in FIG. 11) and a width (a vertical dimension as seen in FIG. 11), which are considerably larger than the diameter of the steering shaft 40. The first plate 96 has a circular center hole 102.

Each of the two second plates 98 is a generally elongate rectangular plate having a length slightly larger than the length of the first plate 96, and a width equal to about one third of that of the first plate 96. Each second plate 98 has two through-holes 104 formed in respective two adjacent corner portions thereof that are spaced apart from each other in the direction of its length, as shown in FIG. 11.

Each of the two elastic members 100 interposed between the first plate 96 and the two second plates 98 is a generally rectangular block having a width equal to about one fourth of that of the first plate 96, a length substantially equal to that of the first plate 96, and a predetermined thickness or height.

In the present connecting device 94, the two second plates 98 are spaced apart from the first plate 96 by a predetermined distance in a direction perpendicular to the planes of the plates 96, 98, and the two second plates 98 are opposed to respective longitudinal opposite end portions of the first plate 96, with a predetermined spacing 106 provided between the two second plates 98 in the longitudinal direction of the first plate 96, as shown in FIG. 12.

The two elastic members 100 each in the form of a generally rectangular block are interposed between the first plate 96 and the two second plates 98, such that the two elastic members 100 are spaced apart from each other in the longitudinal direction of the first plate, and such that the opposed end portions of the two elastic members 100 are located within the spacing 106 between the two second plates 98. The first plate 78 and the two second plates 80 are bonded at their opposed surfaces to the opposite surfaces of each elastic member 100 in the process of vulcanization of the rubber material to form the elastic member 100.

Thus, the first plate 96 and the two second plates 98 are elastically connected to each other by only the two elastic members 100, 100, to form the connecting device 94. The thus constructed connecting device 94 has the four through-holes 104 at the respective four corner portions, with each second plate 98 having the two through-holes 104, 104.

The connecting device 94 constructed as described above is installed on the vehicle such that the first plate 96 is fixed to the steering shaft 40, such that the generally rectangular surface of the first plate 96 opposite to the generally rectangular surface bonded to the elastic members 100 is held in contact with the end face of the steering shaft 40. The first plate 78 is fixed to the steering shaft 40 with a fixing screw 108 screwed through the center hole 102 into the end portion of the steering shaft 40, so that the steering shaft 40 and the first plate 96 are rotatable as a unit. On the other hand, the two second plates 98, 98 are fixed to the annular boss 50 of the steering wheel 44, such that the surfaces of the second plates 98 remote from the first plate 96 are held in contact with the end face of the annular boss 50 remote from the rim portion 46. The second plates 98 are fixed to the steering wheel 44 with fixing screws 110 screwed through the through-holes 104 into the end portion of the annular boss 50, so that the steering wheel 44 and the second plates 98 are rotatable as a unit. The screws 110 are located at a radially outer portion of the annular boss 50.

In the present connecting device 94, the annular boss 50 of the steering wheel 44 is provided with two axial stopper projections 112 formed on the radially central portion of its end face. In the connecting device 94 installed on the vehicle, the two axial stopper projections 112 extend through the spacing 106 between the two second plates 98 and between the two elastic members 100, such that the opposite ends of each axial stopper projection 112 are spaced apart from the respective opposite surfaces of the two elastic members, as indicated by two-dot chain line in FIG. 11.

In the connecting device 94 according to the fifth embodiment, each of the elastic members 100 is brought into abutting contact with the axial stopper projections 112 extending from the end face of the annular boss 50 of the steering wheel 44, to thereby restrict the amount of elastic deformation of the elastic members 100, when a torsional force is applied to the second plates 98 so as to cause rotation of the second plates 98 relative to the first plate 96 about the axis of the steering wheel 44. Thus, the two axial stopper projections 112 formed on the boss portion 50 of the steering wheel 44 function as relative-rotation restricting means for restricting the maximum amount or angle of rotation of the second plates 98 relative to the first plate 96, which is permitted by the elastic deformation of the elastic members 100. Thus, the connector assembly consisting of the first and second plates 96, 98 and the elastic members 100 does not incorporates the relative-rotation restricting means.

As described above, the connecting device 94 of the fifth embodiment is arranged to elastically connect the steering wheel 44 to the steering shaft 40 by only the two elastic members 100, so as to restrict the maximum amount of rotation of the second plates 98 relative to the first plate 96 upon application of a torsional force to the second plates 98 so as to cause the rotation of the second plates 98 relative to the first plate 96, so that the transmission of the vibration from the vehicle body to the steering wheel 44 through the steering shaft 40 is reduced or prevented, without requiring the steering wheel 44 to have a complicated construction, and without deteriorating the maneuverability of the steering wheel 44 and the steering response of the steering system, as in the first through fourth embodiments described above.

Further, the two elastic members 100 interposed between the first plate 96 and the second plates 98 are spaced apart from the two axial stopper projections 112 formed on the annular boss 50 of the steering wheel 44. When the elastic members 82, 100 elastically deformed upon application of a torsional force to the second plates 98 so as to cause rotation of the second plates 98 relative to the first plate 96 about the axis of the steering wheel 44, the elastic members 100 are brought into abutting contact with the axial stopper projections 112, so that the maximum amount or angle of rotation of the second plates 98 relative to the first plate 96 is restricted. Thus, the present connecting device 94 is arranged to permit easy adjustment of the maximum angle of rotation of the second plates 98 relative to the first plate 96, by suitably determining the spacing distance between each elastic member 100 and the stopper projections 112. In other words, the stopper projections 112 are suitably positioned relative to the second plates 98, so as to establish the desired maximum angle of rotation of the steering wheel 44 relative to the steering shaft 40, that is, an optimum amount of play of the steering wheel 44 in its rotating direction.

While the several embodiments of this invention have been described above in detail for illustrative purpose only, it is to be understood that the present invention is not limited to the details of the illustrated embodiments, and may be otherwise embodied.

In the first and second embodiments, the first member in the form of the inner sleeve 12 is bolted or screwed to the steering shaft 40, while the second member in the form of the outer sleeve 14 is press-fitted in the cylindrical wall 53 of the annular boss 50 of the steering wheel 44. However, the inner and outer sleeves 12, 14 may be fixed to the steering shaft 40 and the steering wheel 44 by any other fixing or fastening means, provided that the steering shaft 40 and the inner sleeve 12 are rotatable as a unit while the steering wheel 44 and the outer sleeve 14 are rotatable as a unit. For instance, the end portion of the steering shaft 40 may be press-fitted in the bore of the inner sleeve 12, or may be welded or otherwise fixed to the inner sleeve 12, and the outer sleeve 14 may be bolted, screwed, welded or otherwise fixed to the cylindrical wall 52 of the steering wheel 44.

Similar modifications may be made for fixing the first member (inner member 12 or first plate 78, 96) and the second member (outer sleeve 14 or second plates 80, 98) to the steering shaft 40 and the steering wheel 44, respectively, in the third through fifth embodiments described above.

While the elastic body 16 has the voids 28 in the first and second embodiments, the provision of the voids 28 is not essential, and the positions and configurations of the voids 28 are not limited to those in the first and second embodiments. Further, each of the voids 28 need not have one central portion 32 and two end portions 36. For example, each void 28 may have only one end portion 36, or may not have any end portion 36, and the central portion 32 and the end portions 36 may be formed independently of each other.

In the first and third embodiments, the relative-rotation restricting means is constituted by the two radial projections 22 or 68 of the inner sleeve or inner member 12. In the second embodiment, the relative-rotation restricting means is constituted by the four radial projections 56 formed on the inner sleeve 12 and the four radial projections 58 formed on the outer sleeve 14. However, the projections 22, 56, 68 formed on the inner sleeve or member 12 are not essential, provided that the outer sleeve 14 is provided with radial projections or projections such as the projections 58, which substantially divide or isolate the elastic body 16 into a plurality of portions.

Further, the configurations and the numbers of the radial projections 22, 56, 68 provided on the inner sleeve or member 12 and the radial projections 58 provided on the outer sleeve 14 are not limited to those of the illustrated embodiments.

In the fourth embodiment, the two axial stopper projections 86 constituting the relative-rotation restricting means are formed as integral parts of the first member in the form of the first plate 78. However, such axial stopper projections may be formed on the second member to be fixed to the steering wheel 44.

In the fifth embodiment, the two elastic members 100 are interposed between the first member in the form of the first plate 96 and the second member in the form of the second plates 98, such that the two elastic members 100 are spaced apart from each other while the end portions of the two axial projections 112 which function as the relative-rotation restricting means are located between the two spaced-apart elastic members 100, so that the axial projections 112 are brought into abutting contact with the elastic members 100 upon rotation of the steering wheel 44, to thereby restrict the amount of elastic deformation of the elastic members 100. However, the axial projections 112 extending from the steering wheel 44 may be otherwise positioned and configured, provided that the axial projections 112 are interposed between the first and second plates 96, 98 and are abuttable on the elastic members 100 in the radial direction of the steering shaft or wheel 40, 44.

In a modification of the connecting device 94 wherein at least three elastic members 100 are provided between the first plate 96 and the two second plates 98 such that the elastic bodies members are spaced apart from each other by a predetermined distance, for example, at least two axial projections 112 extending from the steering wheel 44 may be positioned such that each projection 112 is interposed between the adjacent elastic members 100, so as to be abuttable on the elastic members 100. In a further modification of the connecting device 94 wherein only one elastic member 100 is interposed between the first and second plates 96, 98, a single axial projection 112 extending from the steering wheel 44 may be positioned on one side of the elastic member 100, so as to be abuttable on this elastic body. In a further modification wherein each of at least one elastic member 100 interposed between the first and second plates 96, 98 has at least one hole or recess, an axial projection 112 may be positioned so as to engage with the hole or recess.

The axial stopper projection 112 provided as the relative-rotation restricting means may be replaced by any other stopper projection not provided on the annular boss 50 of the steering wheel 44. For example, such stopper projection may be provided on a rotary member such as the steering shaft 40.

Where the elastic bodies are interposed between the first and second planar members as in the fourth and fifth embodiments, the configurations and numbers of those elastic bodies are not limited to those of the fourth and fifth embodiments.

The inner sleeve or member 12 and first plates 78, 96 provided as the first member, and the configurations of the outer sleeve 14 and second plates 80, 98 provided as the second member are not limited to the details of arrangement and configuration of the illustrated fifth embodiments In all of the five embodiments, the first member is fixed to the steering shaft 40, for rotation of the first member and the steering shaft 40 as a unit. However, the first member may be fixed to any other rotary member in the steering system of the vehicle, provided that the rotary member is supported by a stationary member fixed to the vehicle body, such that the rotary member is rotatable about its axis.

Although the five embodiments of this invention are in the form of a steering-wheel connecting device including a steering-wheel connector structure arranged to connect a steering wheel to a steering shaft in a steering system of an automobile, the principle of the present invention is equally applicable to a steering-wheel connector device and a steering-wheel connecting device for any other types of vehicle provided with a steering wheel.

It is to be understood that each of the connecting devices 10, 53, 62 and 76 according to the first through fourth embodiments is a connector assembly including the relative-rotation restricting means (22; 56; 56, 58; 86) provided on the first member (12; 78, 96). In this respect, it is noted that the connector assembly is interpreted to mean an assembly manufactured independently of the other components of the steering system, such as the steering shaft 40 and the steering wheel 44. On the other hand, the connecting device 94 according to the fifth embodiment includes a connector assembly (not including the relative-rotation restricting means 112), and the relative-rotation restricting means 112 provided on the steering wheel 44. All of the connecting devices 10, 53, 62, 76, 94 have a connector structure which includes the first and second member and elastic body (bodies), and the relative-rotation restricting means which may or may not be incorporated in the connector assembly.

It is to be further understood that the present invention may be embodied with various other changes, modifications and improvements, which may occur to those skilled in the art, without departing from the spirit and scope of the invention defined in the following claims.

What is claimed is:

1. A steering-wheel connector assembly for elastically connecting a steering wheel of a vehicle to a rotary member which is supported by a stationary member fixed to a body of the vehicle such that the rotary member is rotatable about an axis thereof, upon rotation of the steering wheel to steer the vehicle, said connector assembly comprising:

a first member to be fixed to said rotary member such that said first member and said rotary member are rotatable as a unit;

a second member to be fixed to said steering wheel such that said second member and said steering wheel are rotatable as a unit;

an elastic body interposed between said first and second members such that said steering wheel is elastically connected to said rotary member by only said elastic body through said first and second members; and relative-rotation restricting means located between said first and second members, for restricting an amount of elastic deformation of said elastic body upon a rotary motion of said second member relative to said first member, to restrict a maximum angle of rotation of said second member relative to said first member, which rotation is permitted by the elastic deformation of said elastic body, whereby a maximum angle of rotation of said steering wheel relative to said rotary member is restricted by said relative-rotation restricting means.

2. The steering-wheel connector assembly according to claim 1, wherein said rotary member is a steering shaft operatively connected to a steerable wheel of the vehicle.

3. The steering-wheel connector assembly according to claim 1, wherein said elastic body has at least one void formed therethrough so as to extend in an axial direction of said steering wheel.

4. The steering-wheel connector assembly according to claim 3, wherein said at least one void consists of a plurality of voids including two voids which are opposed to each other in a diametric direction of said steering wheel.

5. The steering-wheel connector assembly according to claim 4, wherein said plurality of voids consist of four voids which are equally spaced from each other by an angular interval of 90° in a rotating direction of said steering wheel.

6. The steering-wheel connector assembly according to claim 3, wherein at least one of said at least one void is partially defined by at least one pair of opposed inner surfaces which are opposed to each other in a rotating direction of said steering wheel, and which are brought into abutting contact with each other upon a rotary motion of said steering wheel relative to said rotary member.

7. The steering-wheel connector assembly according to claim 1, wherein said first member consists of an inner cylindrical member to be coaxially fixed to said rotary member, and said second member consists of an outer cylindrical member which is disposed radially outwardly of said inner cylindrical member with a predetermined radial spacing therebetween and which is to be coaxially fixed to said steering wheel, said elastic body being interposed between said inner and outer cylindrical members, and wherein said relative-rotation restricting means includes a plurality of projections each of which extends from one of an outer circumferential surface of said inner cylindrical member and an inner circumferential surface of said outer cylindrical member toward the other of said outer and inner circumferential surfaces, so as to substantially isolate said elastic body into a plurality of portions.

8. The steering-wheel connector assembly according to claim 1, wherein said first member consists of a hollow inner member open at one of opposite ends thereof and having a bottom wall which closes the other of said apposite ends and at which said hollow inner member is to be fixed to said rotary member, and said second member consists of a cylindrical outer member which is disposed outwardly of said hollow inner member with a predetermined spacing therebetween in a radial direction of said cylindrical outer member and which is to be coaxially fixed to said steering wheel, said elastic body being interposed between said inner and outer cylindrical members, and wherein said hollow inner member has side walls which cooperate with said bottom wall to define a hollow of the hollow inner member and which provide a plurality of projections extending toward an inner circumferential surface of said cylindrical outer member, so as to substantially isolate said elastic body into a plurality of portions, said relative-rotation restricting means including said plurality of projections.

9. The steering-wheel connector assembly according to claim 1, wherein said first member consists of a first planar member to be fixed to an end portion of said rotary member, and said second member consists of a second planar member which is spaced apart from said first planar member in an axial direction of said rotary member and which is to be fixed to said steering wheel, said elastic body consisting of a plurality of elastic members which are interposed between said first and second planar members and which are spaced apart from each other in said axial direction of said rotary member, and wherein said relative-rotation restricting means includes at least one axial projection each of which extends from one of said first and second planar members toward the other of said first and second planar members, between adjacent ones of said plurality of elastic members, such that said each axial projection is spaced apart from said adjacent ones of said plurality of members.

10. A steering-wheel connecting device for elastically connecting a steering wheel of a vehicle to a rotary member which is supported by a stationary member fixed to a body of the vehicle such that the rotary member is rotatable about an axis thereof, upon rotation of the steering wheel to steer the vehicle, said connecting device comprising:

a first member to be fixed to said rotary member such that said first member and said rotary member are rotatable as a unit;

a second member to be fixed to said steering wheel such that said second member and said steering wheel are rotatable as a unit;

an elastic body interposed between said first and second members such that said steering wheel is elastically connected to said rotary member by only said elastic body through said first and second members; and relative-rotation restricting means located between said first and second members, for restricting an amount of elastic deformation of said elastic body upon a rotary motion of said second member relative to said first member, to restrict a maximum angle of rotation of said second member relative to said first member, which rotation is permitted by the elastic deformation of said elastic body, whereby a maximum angle of rotation of said steering wheel relative to said rotary member is restricted by said relative-rotation restricting means.

11. The steering-wheel connecting device according to claim 10, wherein said relative-rotation restricting means is provided in a connector assembly which includes said first and second members and said elastic body and which is to be used in a steering system of the vehicle that includes said steering wheel and said rotary member.

12. The steering-wheel connecting device according to claim 10, wherein said relative-rotation restricting means is provided on said first member of said connector assembly.

13. The steering-wheel connecting device according to claim 10, wherein said relative-rotation restricting means includes at least one axial projection each of which extends from said steering wheel in an axial direction of said steering wheel such that said each of said at least one axial projection is located between said first and second members, said at least one axial projection being brought into abutting contact with said elastic body in a radial direction of said rotary member upon a rotary motion of said second member relative to said first member, whereby an amount of elastic deformation of said elastic body is restricted by said ax least one axial projection.

* * * * *